United States Patent [19]

Huelle

[11] Patent Number: 5,118,071
[45] Date of Patent: Jun. 2, 1992

[54] ELECTRONICALLY DRIVEN CONTROL VALVE

[75] Inventor: Zbigniew R. Huelle, Hanover, Fed. Rep. of Germany

[73] Assignee: Dr. Huelle Energie, Engineering GmbH, Hanover, Fed. Rep. of Germany

[21] Appl. No.: 664,791

[22] Filed: Mar. 5, 1991

Related U.S. Application Data

[63] Continuation of Ser. No. 427,877, Oct. 30, 1989, abandoned.

[30] Foreign Application Priority Data

Nov. 1, 1988 [DE] Fed. Rep. of Germany ....... 3837083
Nov. 16, 1988 [DE] Fed. Rep. of Germany ....... 3838765

[51] Int. Cl.⁵ .......................................... F16K 31/68
[52] U.S. Cl. .......................................... 251/11; 251/5; 137/554
[58] Field of Search ............... 251/4, 5, 7, 11; 60/527, 528; 137/554, 556

[56] References Cited

U.S. PATENT DOCUMENTS

| 2,241,086 | 5/1941 | Gould | 251/11 X |
| 2,662,550 | 12/1953 | Meyer | 251/4 X |
| 3,041,821 | 7/1962 | Lindberg, Jr. | 60/527 |
| 4,132,382 | 1/1979 | Jackson | 251/5 |
| 4,494,345 | 1/1985 | Peterson | 251/5 X |
| 4,583,365 | 4/1986 | John | 60/528 |
| 4,800,920 | 1/1989 | Yusho, Jr. et al. | 137/556 |

FOREIGN PATENT DOCUMENTS 184573 9/1966 U.S.S.R. ................................. 251/5

Primary Examiner—John C. Fox
Attorney, Agent, or Firm—Shlesinger, Arkwright & Garvey

[57] ABSTRACT

An electronically driven control valve, in particular for refrigeration, comprises a main pipe (2) with two end pieces (4, 6) which can be made into inlet and outlet and an elastic center piece (8) which can be loaded externally with pressure to change its shape and hence its flow cross-section. The main pipe is surrounded in the zone of the elastic center piece by a perforated support tube (10) which in turn is surrounded at a distance by an enclosing tube (12), whereby an impermeably sealed enclosing space (16) is formed between the center piece (8) and the enclosing tube (12). A filling medium (18) in the saturated state is present in that enclosing space. This filling medium can be heated by a heater element to generate a desired vapor pressure and to change the shape of the elastic center piece. The change in shape of the elastic center piece is sensed using an inductive or capacitive pickup (25). The measurement signals from the pickup are analyzed to drive the control valve.

29 Claims, 21 Drawing Sheets

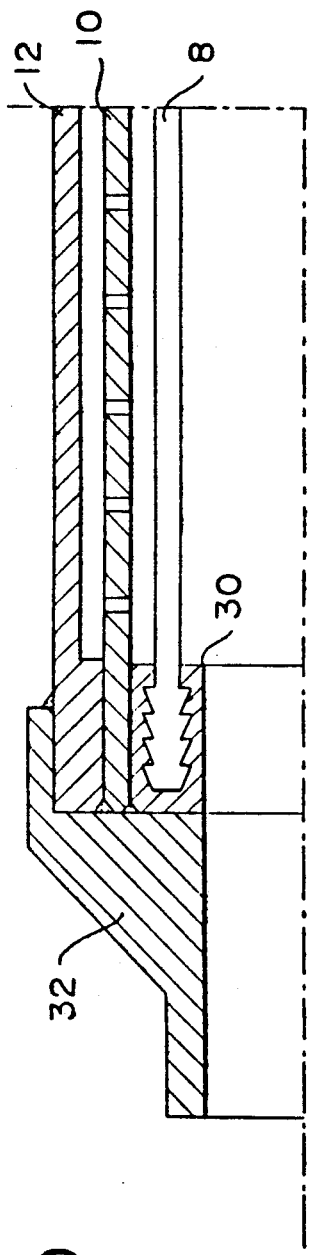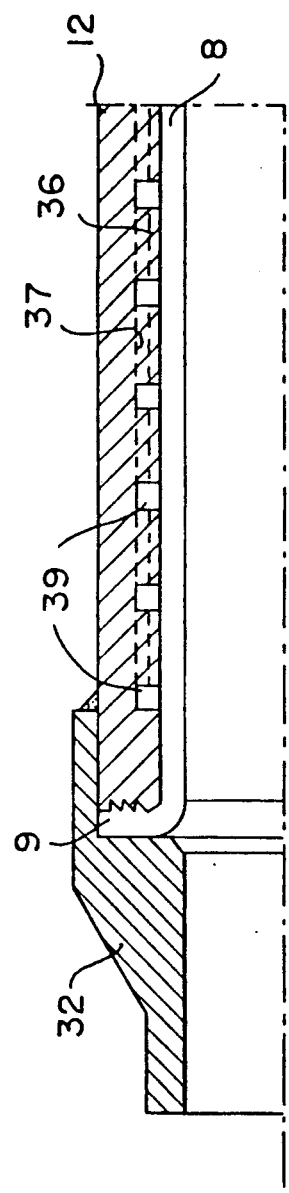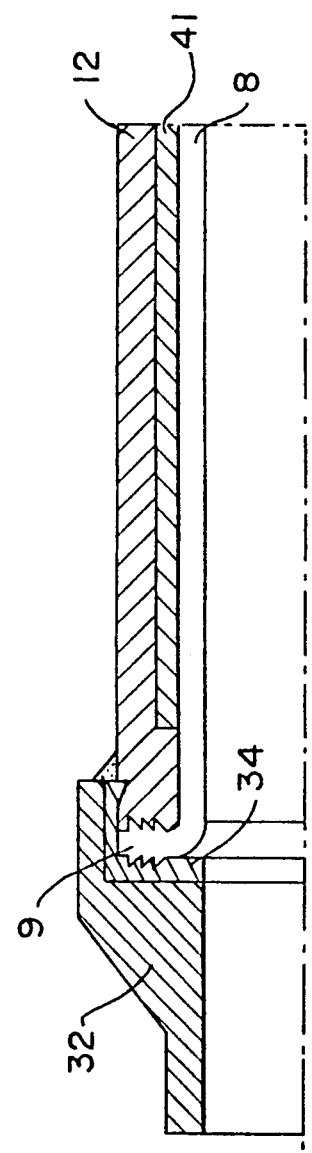

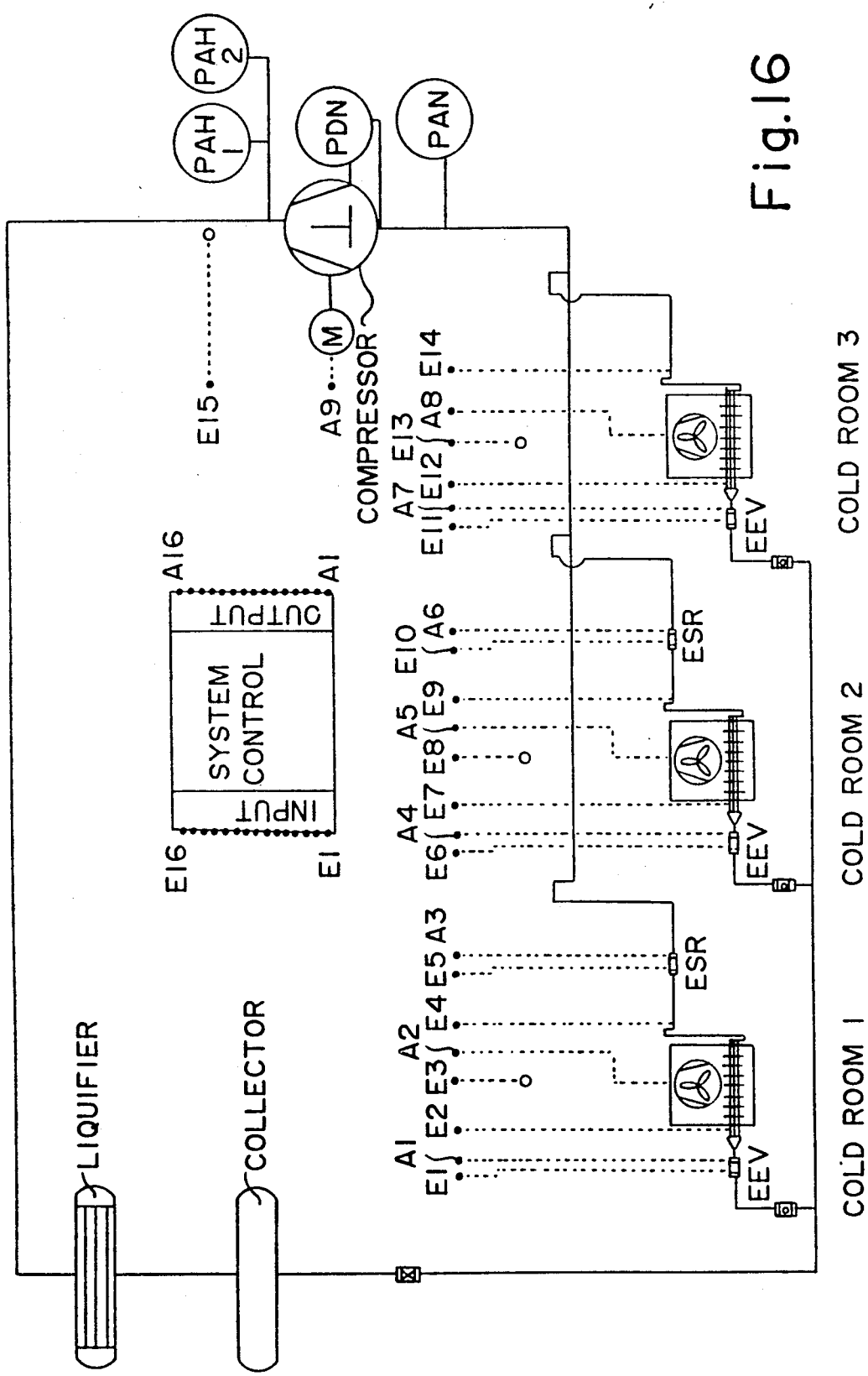

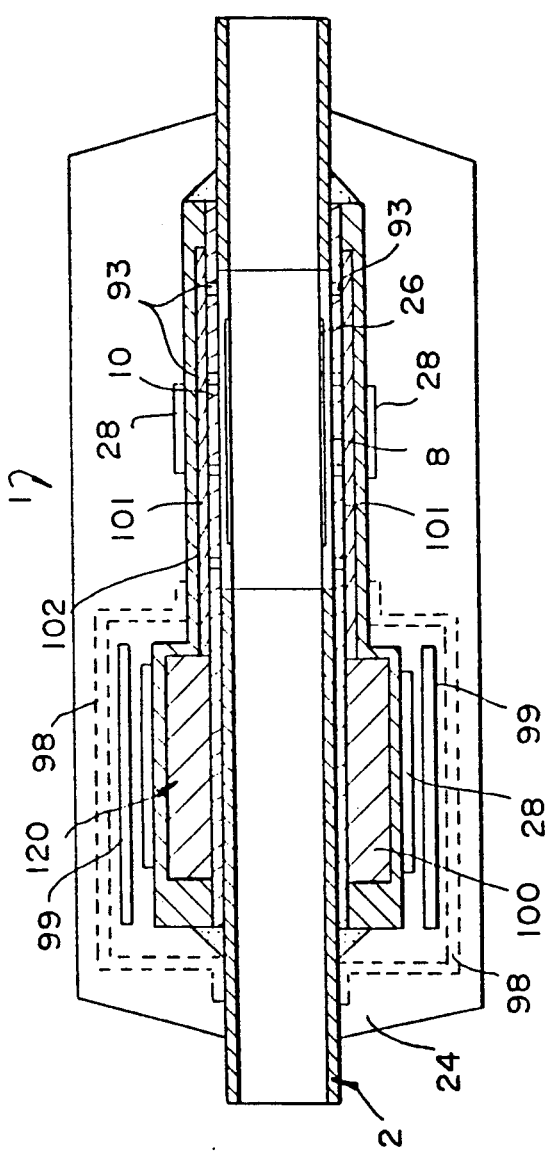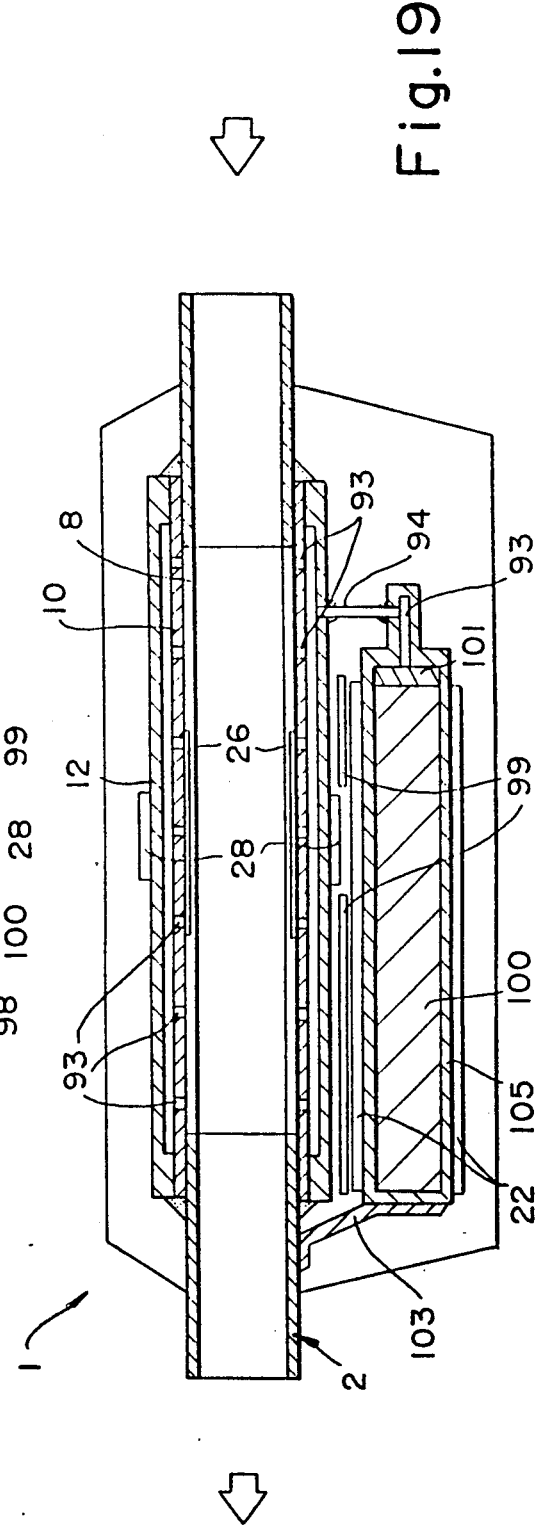

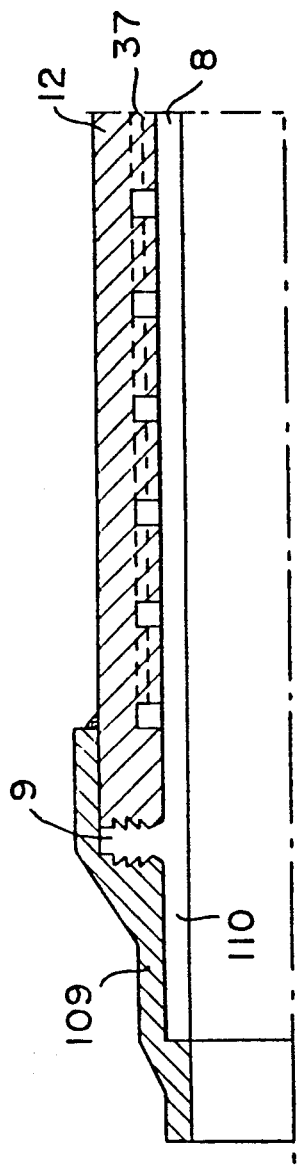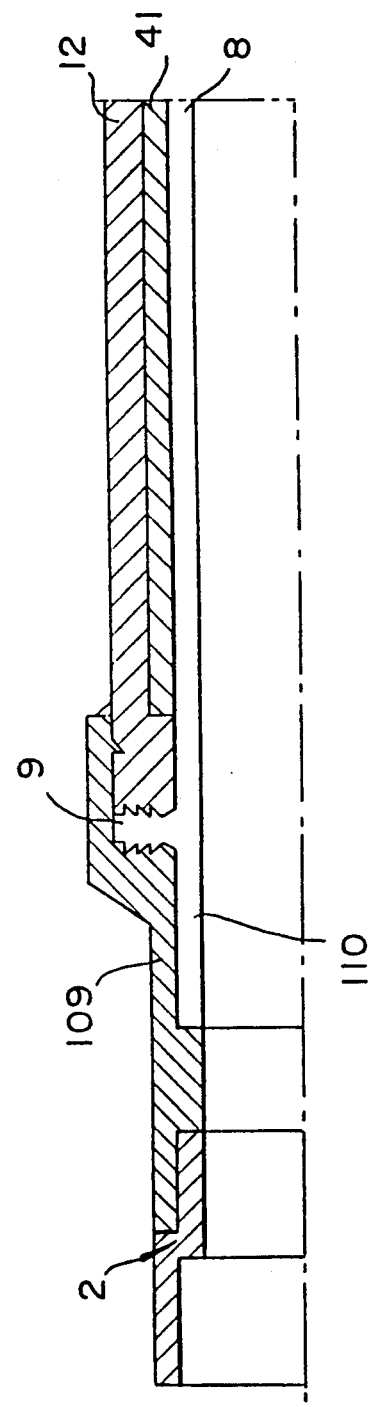

ELECTRONICALLY DRIVEN CONTROL VALVE

This is a continuation of application Ser. No. 07/427,877, filed Oct. 30, 1989 now abandoned.

The invention concerns an electronically driven control valve.

Such control valves are used especially widely in refrigeration, which includes air conditioning, desiccation and other fields where refrigeration units of different designs and outputs are the main components.

The state of development in refrigeration may be best illustrated in relation to that of the three main components, namely the coolants, the machines and equipment and also their control.

For many years the technology of ammonia, an ecological coolant but toxic to man, characterized refrigeration technology; the compressors, heat exchangers and control were matched to the specific, technical properties of ammonia.

Following the invention of the fluorine-chlorine-hydrocarbons (hereafter FCHC), the ammonia technology was replaced by the less toxic and apparently more ecological technology of this coolant in many areas of refrigeration.

The development of both technologies (ammonia and FCHC) was much marked by the development of heat exchangers and control.

On one hand the need for higher efficiency in equipment design (improved heat transfer, smaller, more compact heat exchangers) and on the other hand the difficult-to-implement control of the physically very complex dual-phase flows in these heat exchangers led to designing plants with constrained circulation of the operational medium through the evaporators and to ensuing very large quantities of coolants in the circuits (see FIGS. 5 and 6 for pump outputs with required large-scale collectors/separators, refrigeration plants with so-called flooded evaporation).

There has been stagnation for many years regarding further developments, and heretofore no steps have been made clear that would lead to the necessary changes in refrigeration design.

The large amounts of coolants in the refrigeration plants entail the following dangers:

(a) as regards ammonia, there is the danger to humans in the immediate vicinity of the refrigeration plant (toxicity), through no ecological jeopardy.

(b) as regards FCHC, there is less direct danger to humans however there has been in recent years the ever clearer large jeopardy to the environment (ozone hole); accordingly even if circuitously, there is very large danger to humans.

Reduction of these dangers can be achieved only by reducing the amounts of coolants in the refrigeration plants.

As already cited, there is a close relationship between the development of coolants, machines and equipment and control.

Therefore the reduction of the amounts of coolants in the refrigeration plants is possible only by a planned development of a new kind of control (control valves and regulators) with simultaneous further development of the equipment (heat exchangers, mainly evaporators).

The large amounts of coolants are mainly determined by the circuits with flooded evaporators of FIGS. 5 and 6. These must be replaced by circuits with so-called "dry" evaporators (only slight amounts of coolant)—see FIGS. 7, 8.

In order to implement the novel, "dry" evaporation processes, the following components must be developed anew:
 the adjustment means (control valves), and
 the associated control circuits of electronic nature.

In a further step, the control of the dry evaporators shall be integrated into the system control. This means herein the multi-step control (inclusion of further control parameters) for optimization relative to power (adaptive control methods).

The circuits with "dry" evaporation, with were "co-developed" with the FCHC technology, today are used almost exclusively among this set of coolants.

Use of ammonia is limited on the following grounds:
 ammonia evinces a very high specific refrigerating capacity (kw/kg), resulting in excessively small flow cross-sections of the throttling means (expansion valves),
 these very small cross-sections easily clog from the dirt entirely normal in ammonia plants, resulting in operational malfunctions,
 the water always dissolved in ammonia, be it in very small proportions, may freeze in the above small cross-section and thus contribute to clogging the valves.

FIG. 7 shows a typical circuit with "dry" evaporation of the state of the art with mechanical control of the individual units. The single-stage refrigeration equipment with one compressor cools three cold rooms.

The evaporators are fed in all three cold rooms in controlled manner by mechanical, thermostatic expansion valves.

The temperature in the cold room 3 is the lowest in all cold rooms and is not controlled by continuously turning ON and OFF the evaporator fan. The temperature in cold rooms 1 and 2 is continuously controlled by the suction control (raising and lowering the evaporation temperature depending on the thermal load on the cold rooms).

The compressor output is not continuously controlled by turning ON and OFF the compressor motor (low-pressure switch PKN).

The main problem of the plants with "dry"-evaporation circuits as yet not solved is the proper feeding of the evaporators through thermostatic expansion valves. The fixed characteristic lines of the known valves and of the evaporators, determined by the mechanical construction, do not permit optimal output utilization of the valve/evaporator system.

A first improvement in feeding the evaporators was achieved using conventional, mechanical expansion valves with "affixed" electric drives. Such drives were controlled by the electronic control coupled to them (FIG. 8).

The following types of drives are known:
 1. Thermal
Danfoss Co. (Denmark), German
Auslegungsschriften 27 49 249; 27 49 250;
Singer Co. (USA)
 2. Step motors
Carrier Co. (USA)
Egelhof co. (Germany)
Japanese companies.

Moreover special magnetic valves in time controlled (ON/OFF) operation (pulse modulation) are being used:

3. Magnetic valves
Danfoss Co. (Denmark)
Altech Co. (USA).

The main component of the valves of the German Auslegungsschriften 27 49 249 and 27 49 250 is a sealed spaced mounted above a drive membrane of the valve and filled with a saturated medium. The temperature of this medium is measured by an electric sensor and kept at a constant value by a regulated heating element.

FIG. 8 shows the same refrigeration plant as FIG. 7 except for a variation in control. The electronic evaporation regulators (TCE) are provided with two temperature sensors—one at the coolant intake and one at the coolant discharge from the evaporator. The electronic evaporation regulators (TCE) in the refrigeration room 1 and in the refrigeration room 2 continuously act on the electronically driven suction controls (PCE). The room-temperature control (TCE) in the refrigeration room 3 acts continuously on the angular speed of the corresponding evaporator fan. The control of the compressor output (ON, OFF) is the same as for the plant shown in FIG. 7.

The efficiency of this kind of evaporator feed depends strongly on the kind of control means being used. The various control means have been designed either as analogue or as digital devices.

The best of the known solutions of evaporator-feed of this kind evince improvements over the mechanical control of FIG. 7; the optimum evaporator feed so far has not been reached.

The heretofore known electronic individual controls are characterized by the following shortcomings:
(a) The employed "tested" mechanical valve designs (fixed seat, closing cone or closing slider) are no improvements (status quo),
(b) Analog control means entail rigid designs lacking adaptability—any desired change is costly and for that reason often impractical.
(c) Digital control means are costly for application to individual apparatus. It is very difficult to introduce general standardization to lower production costs (many solutions).

These shortcomings and the high costs (high manufacturing costs of small runs) of the solutions so far available on the market inhibit application.

Because present valve designs were accepted without improvements, these electronic solutions for individual apparatus are unsuited for ammonia plants (see above discussion concerning ammonia).

The object of the present invention is to create a control valve of the initially cited kind which shall be free of the drawbacks of the known valves and which shall be especially economical to manufacture and not susceptible to malfunction, free of danger of clogging, which can be regulated better, with which the regulation of the evaporation feed is more easily optimized, and of which the use in controlled systems shall substantially reduce the required quantities of coolants.

This problem is solved by the invention.

Advantageous and appropriate further designs of the invention are characterized in the sub-claims.

The advantages achieved by the design of the invention are described below in relation to the enclosed drawings.

Figure 3:
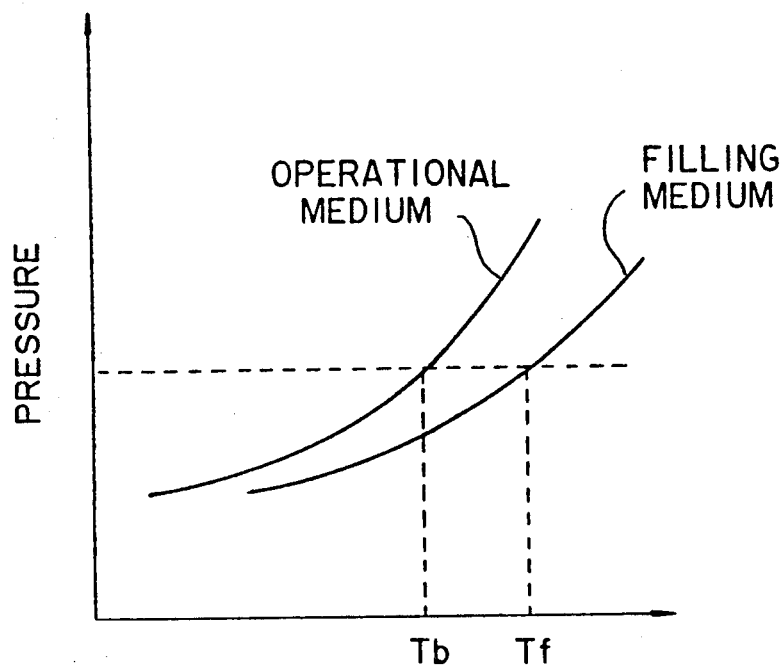
Figure 4:
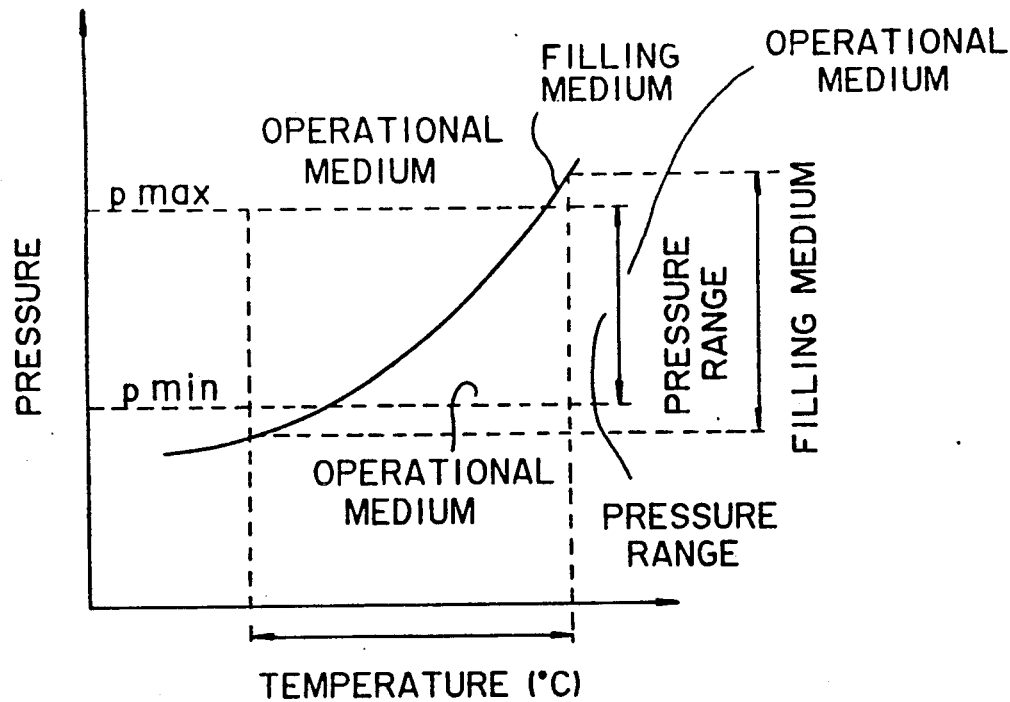
Figure 5:
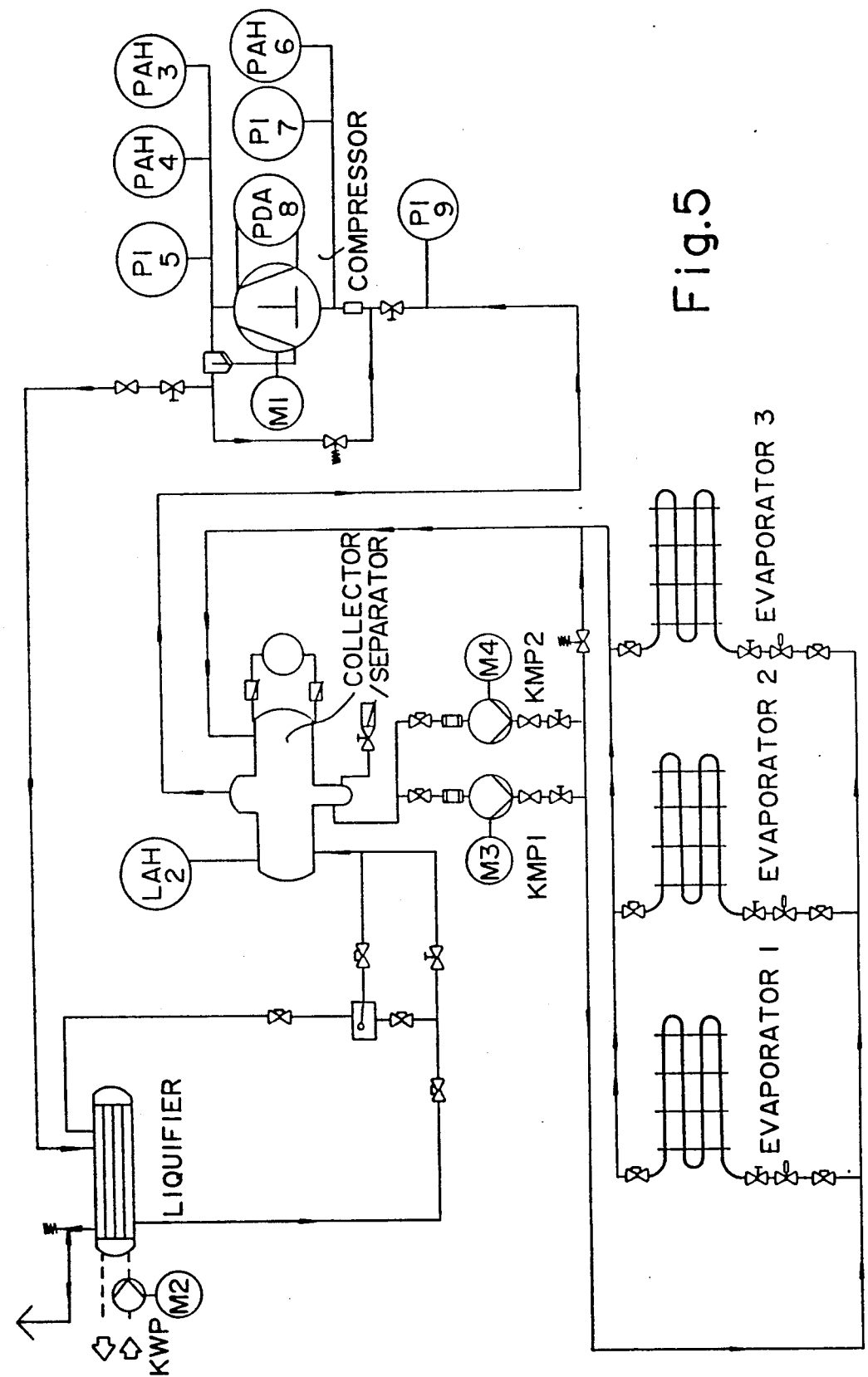
Figure 6:
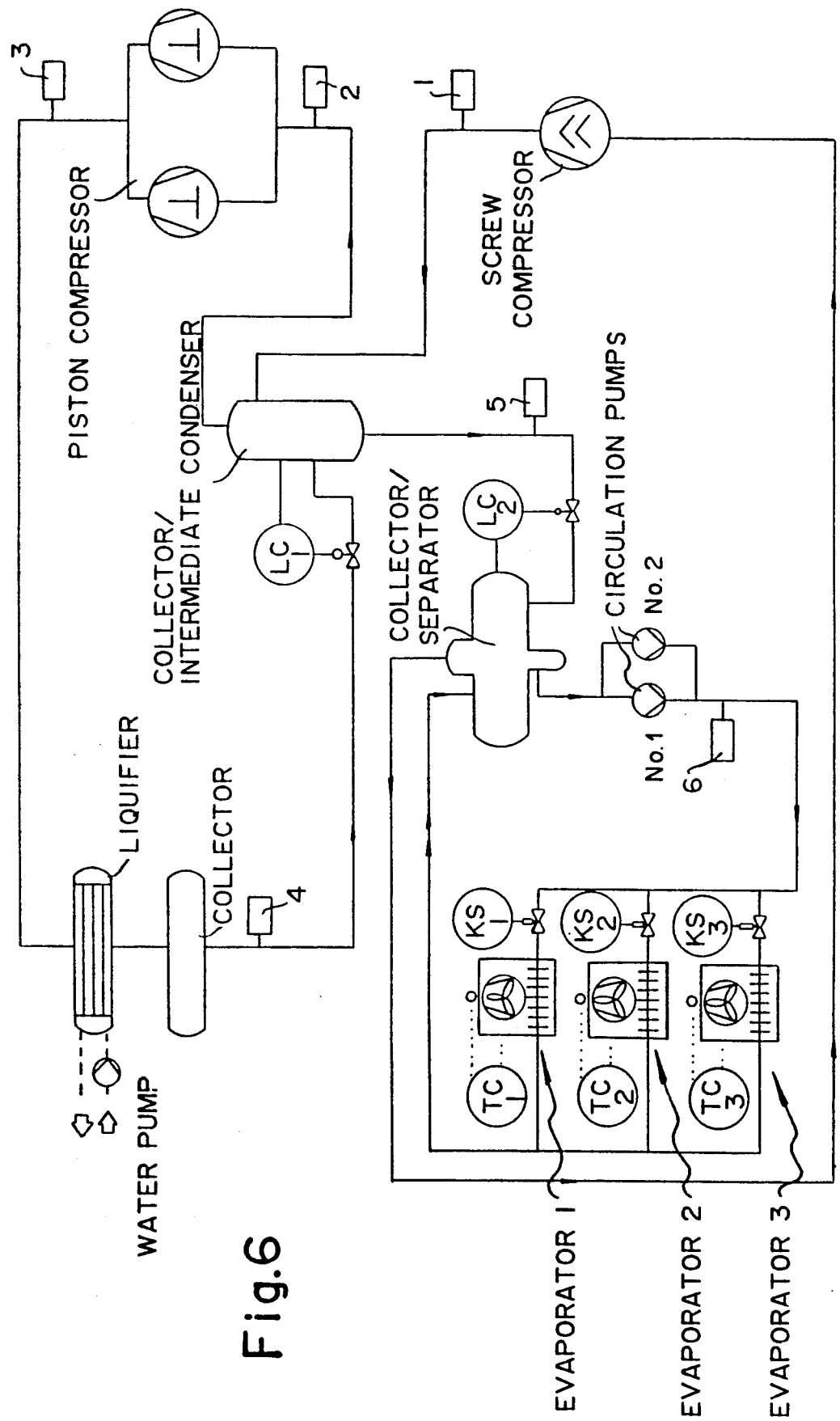
Figure 7:
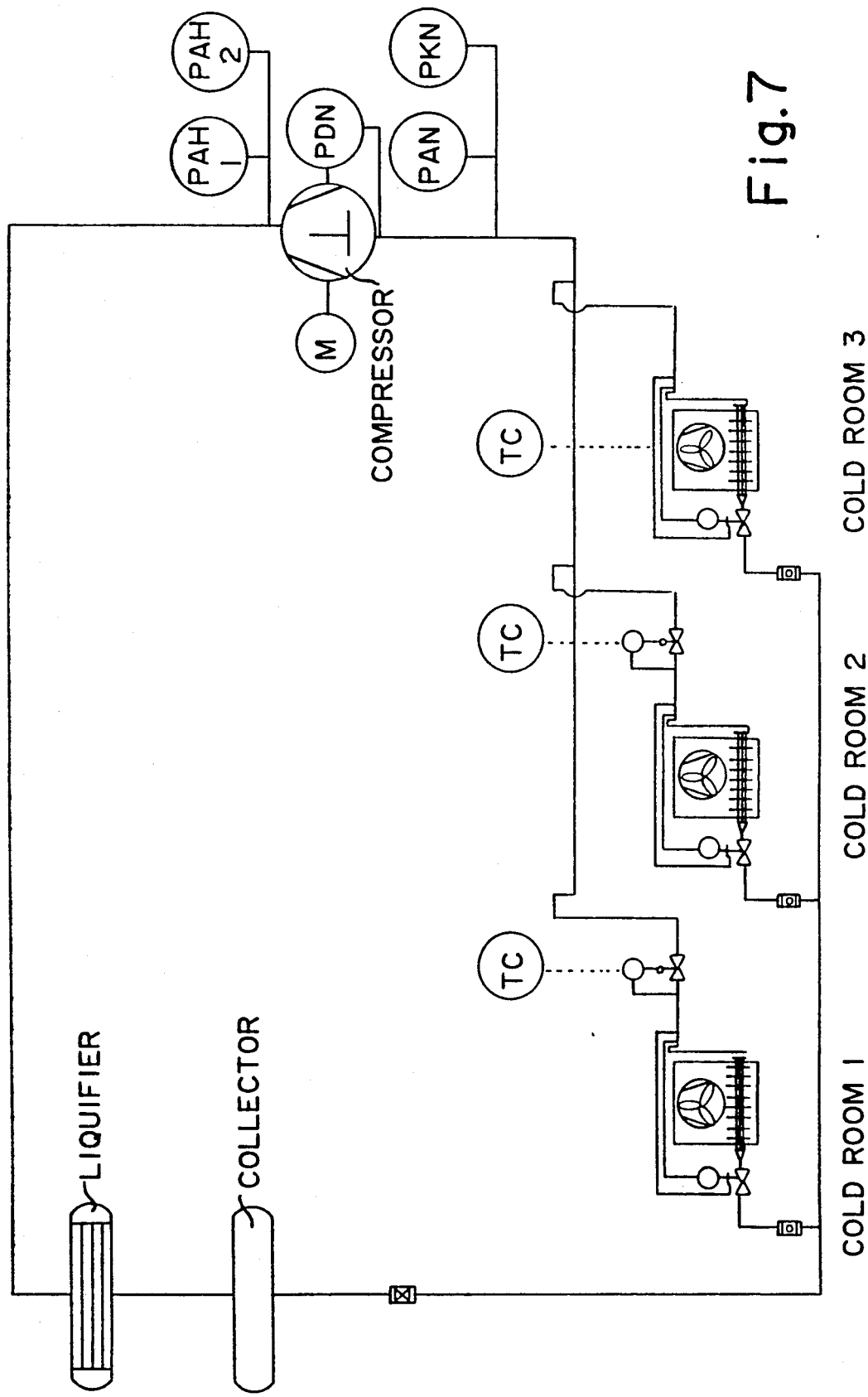
Figure 8:
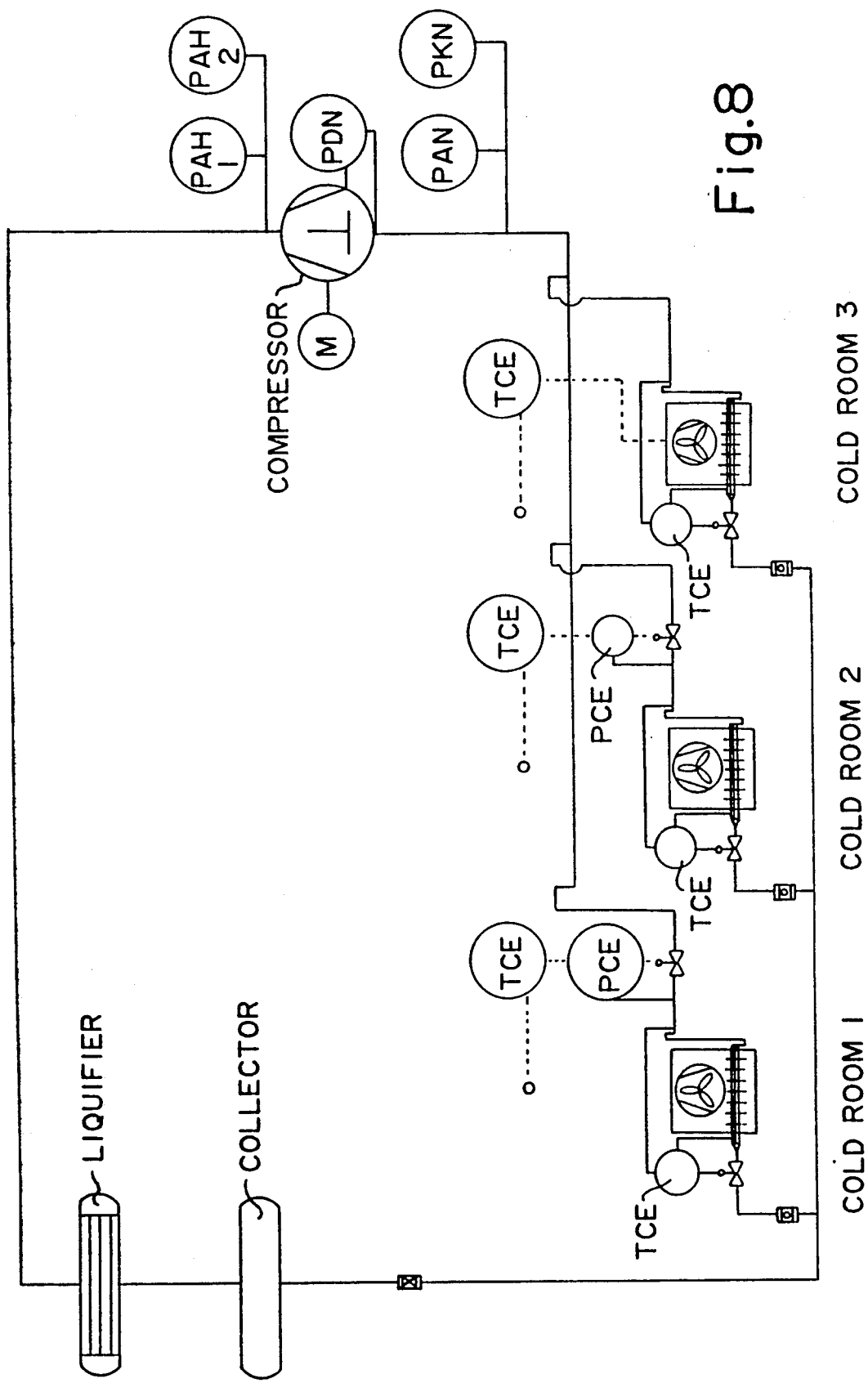

FIGS. 3 and 4 are vapor-pressure curves elucidating the operation of the control valves of the invention, FIGS. 5, 6, 7 and 8 are conventional refrigeration plants, the plant of FIGS. 5 and 6 comprising so-called flooded evaporation and the plants of FIGS. 7 and 8 so-called dry evaporation.

Figure 9:
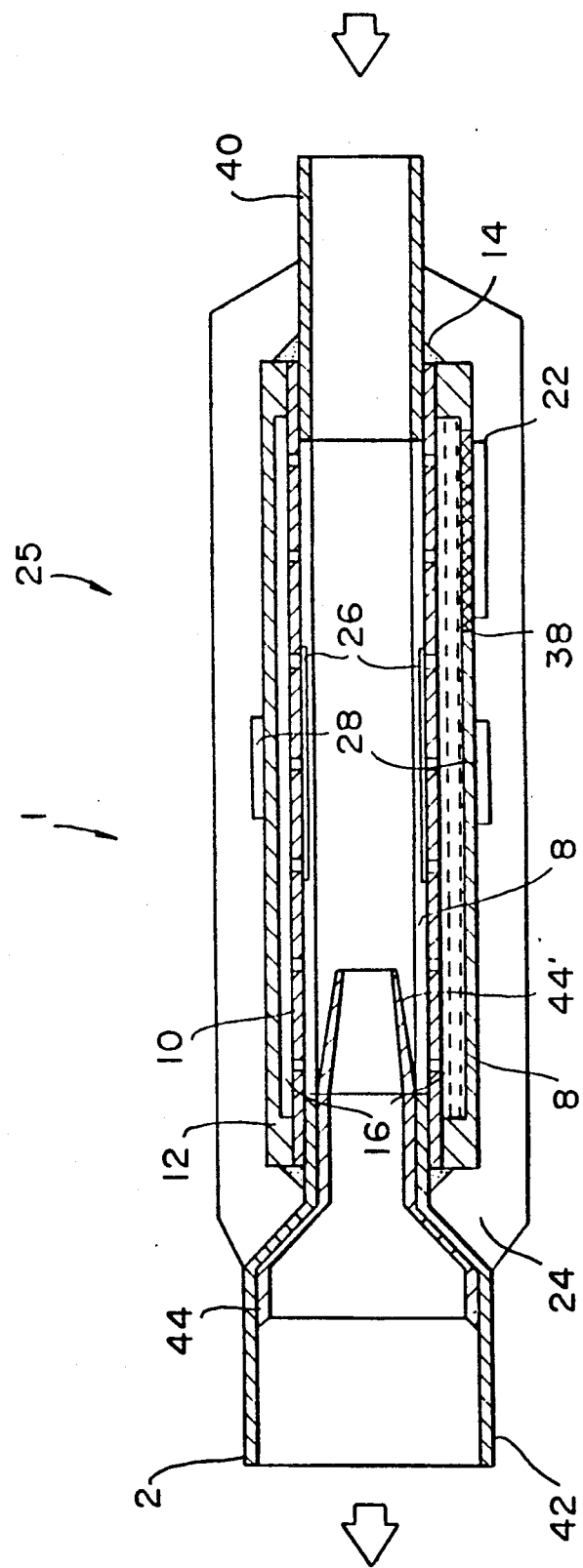
Figure 13:
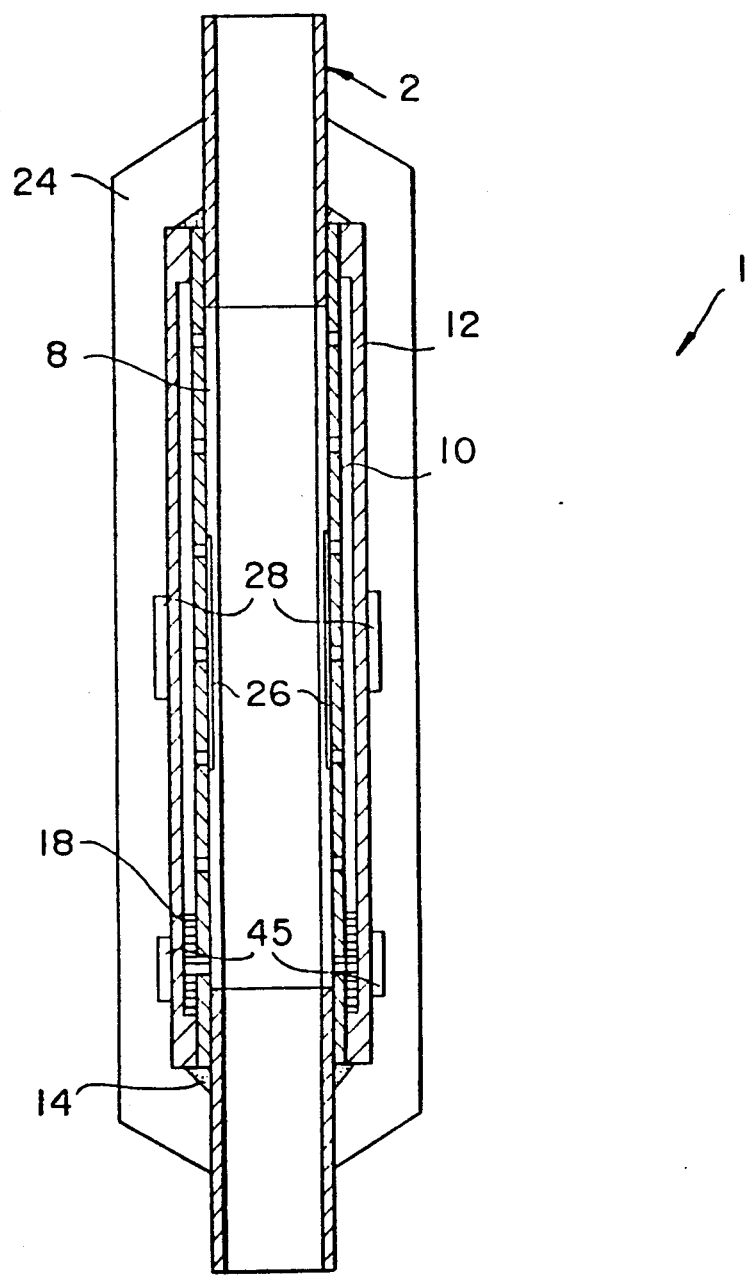
Figure 14:
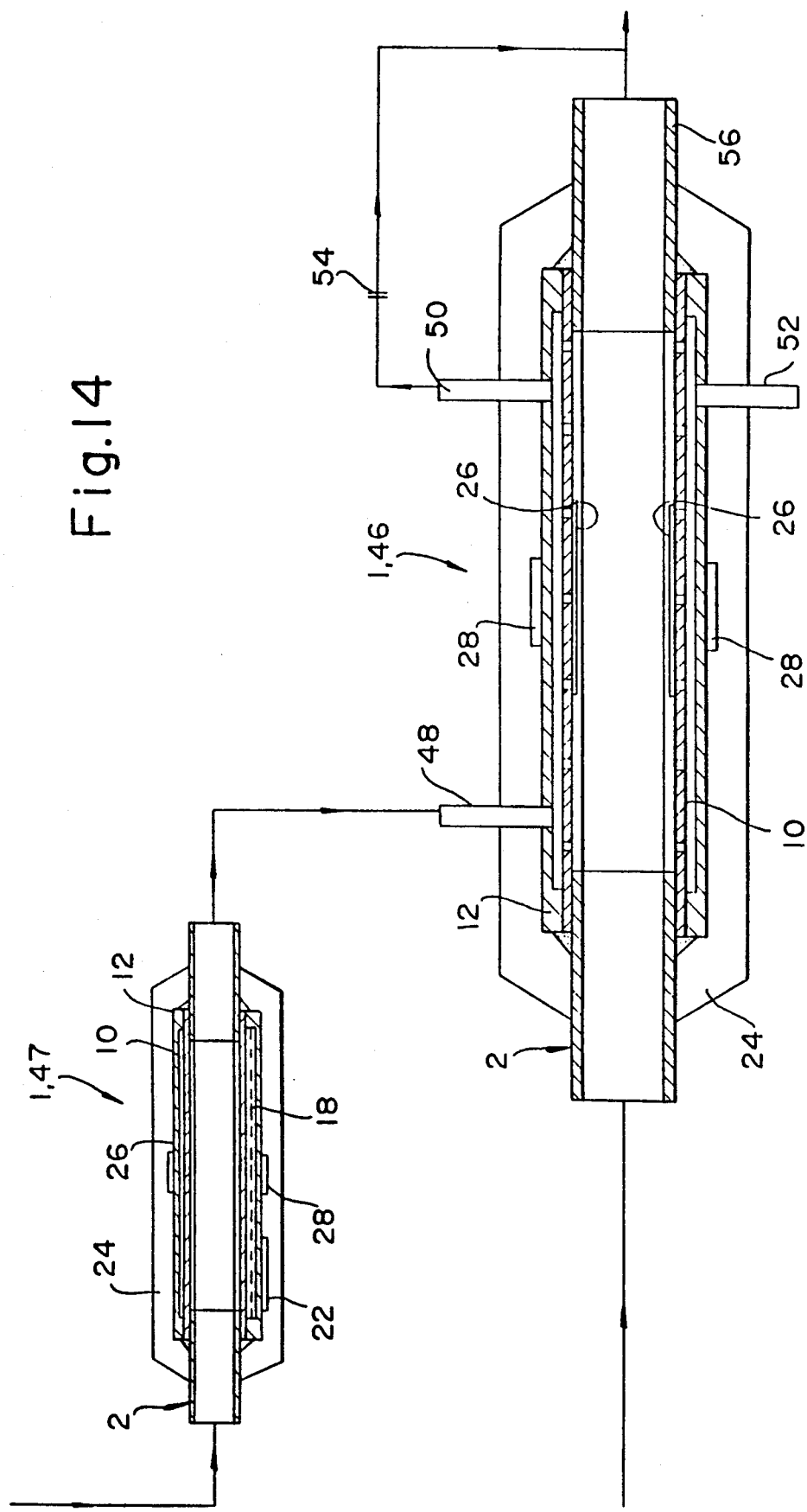
Figure 15:
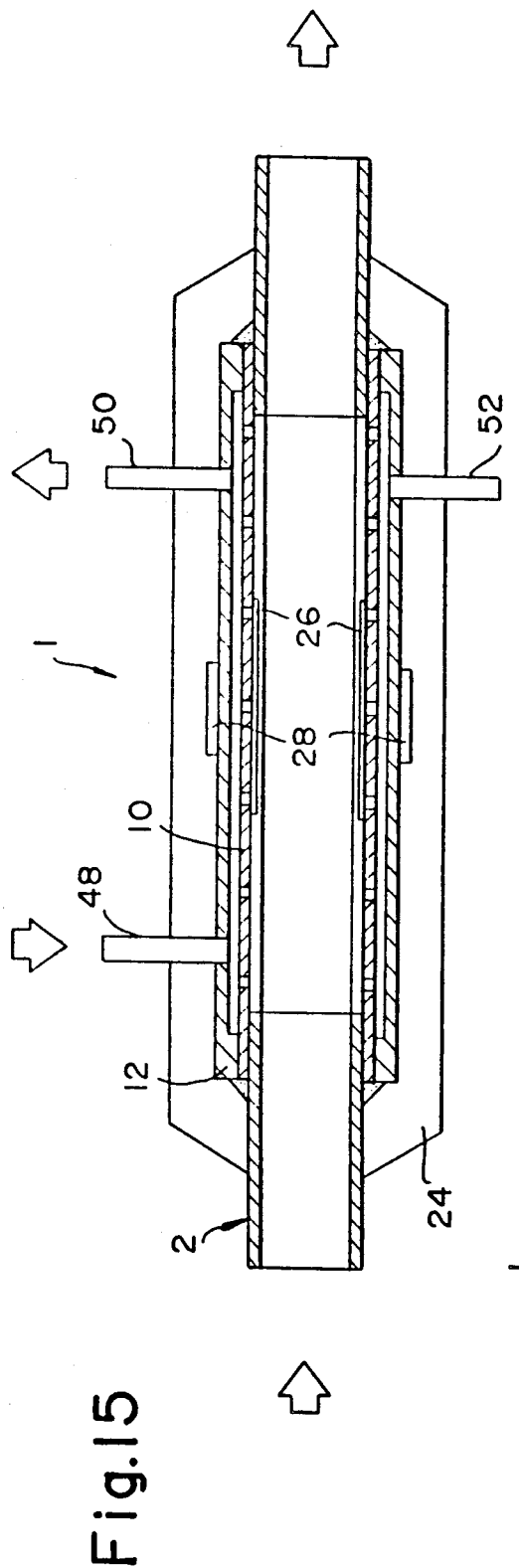

FIG. 9 is a further embodiment mode of the control valve of the invention,

FIGS. 10, 11 and 12 are further modifications of the design of the control valve of the invention, FIG. 13 is a further embodiment mode of the control valve of the invention, in particular for vertical installation, FIGS. 14 and 15 show the application of the control valve of the invention in large outputs in cascade, as a pilot valve and main valve, FIG. 16 shows the application of the control valve of the invention in integrated system control, FIGS. 17 through 23 show further embodiment modes of the control valve of the invention, and FIGS. 24 through 29 are still further design modifications of the control valve of the invention.

For the sake of simplicity, the same components are denoted by the same references in the Figures.

The control valve 1 consists of a main pipe 2 comprising two end pieces 4, 6 which may simultaneously form the intake and outlet stubs, and an elastic center piece 8 of adjustable length.

The center piece and the two end pieces of the main pipe form one unit exposed to the inside pressure of the operational medium flowing through the main pipe. Further the main pipe comprises a perforated support tube 10 mounted in such manner that the elastic center piece is braced against the inside pressure acting outward. In this manner the main pipe with its center piece can withstand the inside pressure; however the shape of the elastic center piece may be affected by an externally applied pneumatic or hydraulic pressure. Depending on the ratio of the external pressure to the inside pressure of the main pipe and on the elasticity of the center piece, this center piece may be appropriately deformed so as to affect the flow through the control valve.

In the presence of a comparatively low external pressure, the elastic center piece is forced by the inside pressure against the inside of the support tube. In this position of the center piece the control valve assumes the position "open all the way". Because of this special design, the pressure drop in the zone of the control valve caused the operational medium flowing through it is very small compared to that in a straight pipe segment of the same dimensions (length and cross-section) as those of the control valve described herein.

If the external pressure is sufficiently large, the elastic center piece is compressed in such a way that flow through the control valve is now impossible. In that position the control valve assumes the position "closed all the way".

As a function of the relative magnitude of the external pressure, the control valve may assume any position between the positions "open all the way" and "closed all the way". Depending on the position assumed by the control valve, the flow of the operational medium through the control valve under such operational conditions will assume a value between "maximum" and "null".

In order to assure regulation of the elastic center pipe, an enclosing tube 12 is mounted around the perforated support tube 10 and spaced from it in such a manner that it tightly seals this support tube 10 from the ambient (atmosphere), for instance by welded seams 14, and in that an enclosing space 16 be formed between the enclosing tube 12 and the center piece 8, said enclosing space being sealed off inside by the elastic center piece 8 and outside by the enclosing tube 12.

In this design, the flow through the control depends is related to the magnitude of the pressure in the enclosing space.

The pressure in the enclosing space may be controlled (increased and decreased) in a variety of ways, basically two distinct procedures being provided:

1. short-term pneumatic or hydraulic (vapor, gas or liquid resp.) connection of the enclosing space to external pressure sources of various magnitudes, and
2. generating a controllable pressure in the enclosing space itself.

The communication of the enclosing space with external pressure sources is described further below. The generation of a controllable pressure in the enclosing space itself shall be described immediately below.

Figure 1:
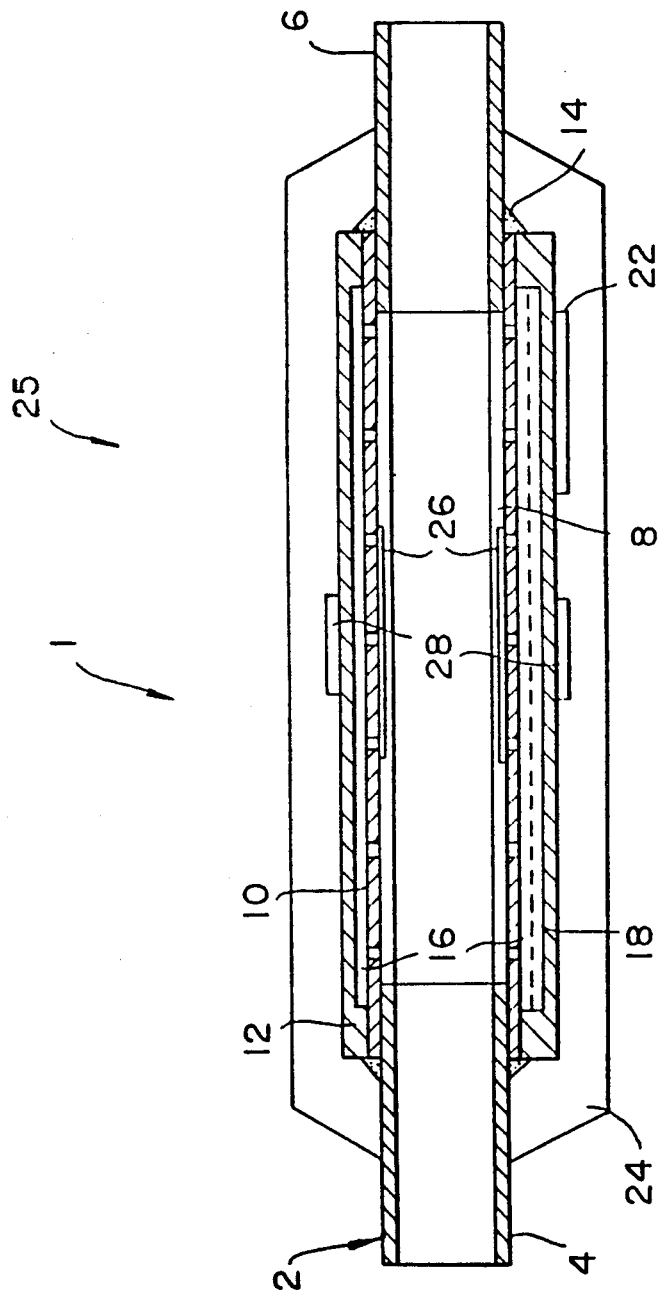
FIG. 1 is a functional diagram of the control valve of the invention.

Upon previous evacuation—the filling stub is omitted from FIG. 1—the enclosing space is filled with a medium which for the particular operating conditions is in the saturated state.

Illustratively isobutane is suitable as the filling medium.

The filling medium consists of the liquid part (liquid phase) 18 accumulating in the lower part of the enclosing space and of the vapor part (vapor phase) above, and fills all the enclosing space. When the filling medium is saturated, the pressure in the enclosing space depends on the temperature of the filling medium. By controlling the filling-medium temperature, the pressure can be correspondingly controlled in the enclosing space.

To achieve pressure control that is free of malfunction, the vapor-pressure curve $[p = f(t)]$ of the filling medium shall deviate from the vapor-pressure curve of the operational medium flowing through the control valve. If this vapor-pressure curve (FIG. 3) is to the right of the vapor-pressure curve of the filling medium, then the same pressure of the filling medium as the pressure of the flowing operational medium shall only be reached at filling medium temperature (Tf) higher than the operational medium temperature (Tb). Suitable operational media illustratively are the coolants R12, R22 and R502, though also ammonia.

If the pressure of the operational medium should be extensively independent under certain circumstances from the temperature of the operational medium (unsaturated state), then a filling medium should be selected of which the vapor-pressure curve covers the anticipated pressure range of the operational medium in the admissible design temperature range (FIG. 4).

The desired matching of the vapor-pressure curve of the filling medium to the vapor-pressure curve of the operational medium may be achieved by selecting a specific, pure filling medium (single substance) or a mixture of different filling media (multiple mixture).

If the temperature of the filling medium is desired to be higher than that of the operational medium, then a certain amount of energy (heat) must be constantly applied to the filling medium to compensate for the heat losses from the filling to the adjacent environment. The energy is supplied by a regulated heater element 22. In this manner an arbitrary temperature of the filling medium may be set and thereby an arbitrary flow of operational medium can be controlled through the control valve. The heating element illustratively may be in the form of an encapsulated heating coil, a PTC element or another design (for instance a power transistor) and may be mounted in different ways to the enclosing tube, illustratively it may be mounted externally to the enclosing tube with a reliably good contact,
it may form an integral part of the enclosing tube,
it may be mounted inside the enclosing tube.

Figure 2:
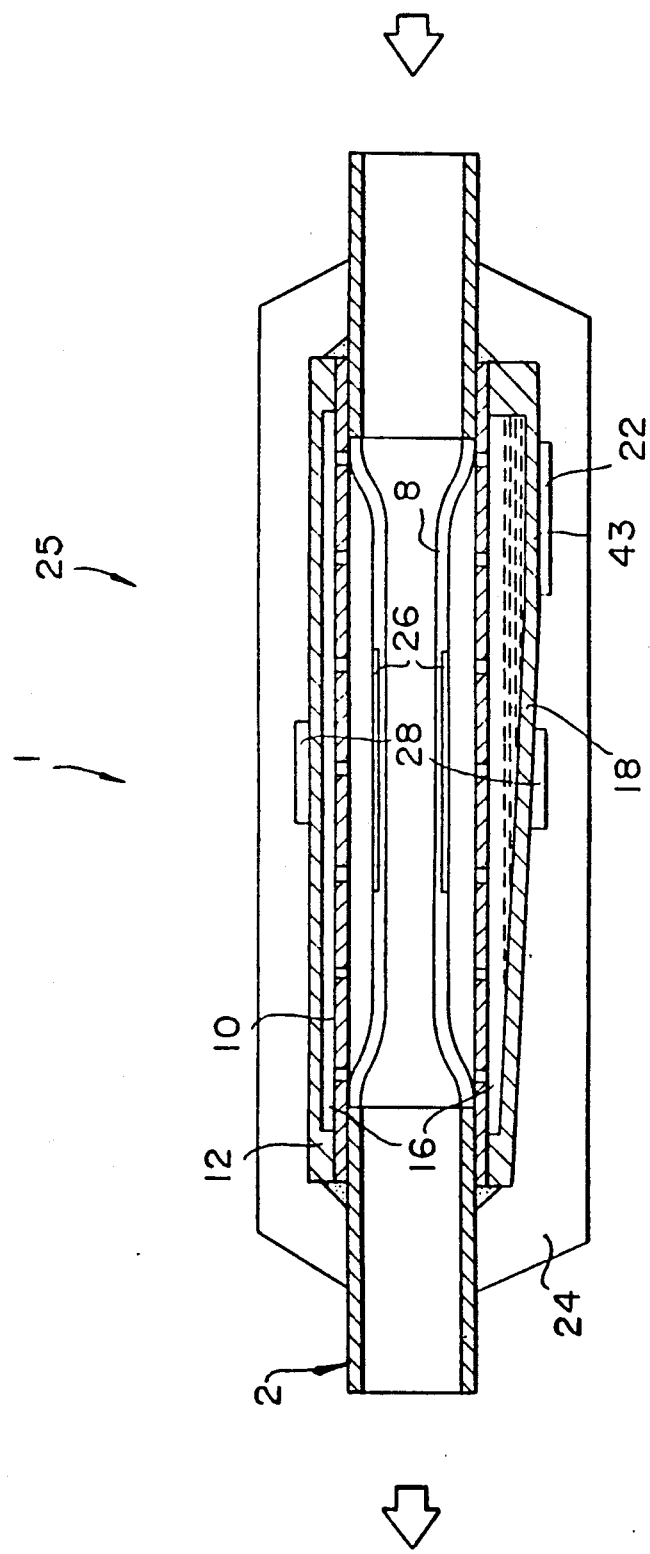
FIG. 2 is a modified embodiment of the control valve of FIG. 1.

FIGS. 1 and 2 show the "external" mounting.

To limit the energy losses (heat losses), the connection of the enclosing tube 12 to the main pipe 2 is thermally insulating and the enclosing tube 12 provided from the outside with a thermally insulating layer 24 (FIG. 1).

Depending on the particular control problems, it may be advantageous to ascertain and record the position (the shape) of the elastic center piece (ascertaining the valve "stroke").

The measurement of the position (of the changing shape) of the elastic center piece may be carried out in different ways.

FIG. 1 shows a measurement principle 25 based on induction. A cylindrical and elastic magnetic layer 26 is integrated into the outer wall of the elastic center piece. Depending on the problem, this layer may contain elements (particles) made of a material with weak magnetic properties (soft iron) or with strong ones (permanent magnet).

A measurement coil 28 is placed on the outside of the enclosing tube 12. This measurement coil may be a coil surrounding the enclosing tube (FIG. 1) or a coil which is installed in plate laterally against the enclosing tube.

Changes in position (in the shape) of the center piece are measured in the form of changes in a magnetic field (induction) using a suitable procedure, and are recorded.

Capacitive measurement may be used in an alternative to ascertain the position of the center piece. In that case the measurement coil is replaced by two (or more) capacitive pickups (electrodes) at the encasing tube and the layer outside the elastic center piece will then consist of a material suitable for capacitance measurements.

The changes in position (shape) in that case shall be recorded as changes in electric field using a suitable procedure.

The valve components shown and described in the functional diagram of FIG. 1 may evince different design features in relation to the manufacturing techniques being used. Several design variations are described below in relation to the other Figures.

The elastic center piece 8 (FIG. 10) may be rolled into a special metal ring 30. The center piece so pre-fabricated thereupon is welded to the other components such as the support tube 10, the enclosing tube 12 and the valve stubs 32.

FIG. 11 shows another solution. In this case terminal ring flanges 9 of the elastic center piece 8 are placed against the end of the enclosing pipe 12 and are impermeably force-fitted between the valve-stub 32 and the enclosing tube 12.

A third variation is shown in FIG. 12. Herein terminal annular flanges 9 of the elastic center piece 8 are impermeably force-fitted between a specially shaped ring 34 and the end of the enclosing tube 12 and are tightly forced between that end of the enclosing tube 12 and a specially shaped ring 34.

The wall thickness of the elastic center piece may evince different values circumferentially and/or longitudinally, namely being
radially constant,
radially variable (angle-dependent), and these radial values also may be
axially constant, or
axially variable.

The design of the perforated support tube 10 may be as follows:

FIGS. 1 and 10 show the perforated support tube 10 in its simple form.

The perforated support tube may be integrated into the enclosing tube 12 (FIG. 11). In this case a special inner rib system 36 with cross-ducts 37 in the enclosing tube assumes the support function for the elastic center piece. In this embodiment mode the enclosing space is formed by the cross-ducts 37. The vapor is forced through the clearances 39 between the ribs.

In another embodiment mode shown in FIG. 12, the inner rib system is replaced by a porous sintered layer 41. In this variation the enclosing space consists of the cavities in the sintered material. The vapor is forced through the sintered material.

The enclosing space too may be shaped differently. FIGS. 1 and 10 show its simplest form.

The enclosing space 16 in that case is preferably eccentric relative to the valve axis (flow center). It is larger at the lower than at the upper part. The liquid phase of the filling medium is present at the lower part of the enclosing space.

To reduce the dependence of the valve operation on the installed position of the valve, the encasing tube of another embodiment mode is at least partly eccentric relative to the valve axis (flow center), whereby the liquid part of the filling which shall be exposed to heating, shall also always remain in contact with the heated part of the encasing tube if the valve is in an oblique position in the manner of a liquid pouch (FIG. 2).

If the valve shall be used only for vertical installation, then the encasing tube 12 may be concentric with the valve axis. In that case the heating element appropriately shall be mounted as a coil 45 to the lower part of the encasing tube (where the liquid phase of the filling medium is present)—FIG. 13

In order to lower the thermal impedance of the enclosing tube 12 at the site touched by the heating element, a special thermally well-conducting element 38 may be integrated into the encasing tube—FIG. 9.

The position of the heating element may vary.

If the control valve is operated as an expansion valve, then, on account of the throttling, a strong temperature gradient shall be created in the valve. To reduce the heat losses of the heater element, this element then appropriately shall be mounted into the valve near the flow intake—FIG. 2.

When used as an expansion valve, the intake stub 40 of the control valve may be smaller in cross-section than the outlet stub 42—FIG. 9.

When the valve is used as an expansion valve, a pressure gradient takes place, which in certain operating conditions may be large. To reduce the stress on the elastic center piece, an insert 44 with a conical rest ring 44' may be installed into flow discharge from the valve housing—FIG. 9.

The valve components may be made of metal, plastic or glass depending on the application.

The elastic center piece 8 can be made from different plasto-elastic materials depending on the application, in pure form (single material), in laminated form (stratification of several different materials) or in reinforced form (different materials and shapes in compound manner).

When used for large outputs, appropriately the cascasde principle may be used employing a pilot-valve-47/main-valve 46—FIG. 14. In this case the lining and the heater element are eliminated from the main valve. The enclosing space is provided additionally with one or more stubs 48, 50, 52. (FIGS. 14, 15).

In this design the main flow of the operational medium is made to pass through the main valve 46. The enclosing space 16 of the main valve (FIGS. 14, 15) communicates with a high-pressure space (pilot valve 47) and with a low-pressure chamber (outlet 56 of the main valve). Depending on the kind of communication with those two spaces, the pressure in the enclosing space can be controlled whereby also there takes place control of the flow of the operational medium through the main valve. The stubs of the enclosing space of the main valve (FIG. 15) make it possible to use the main valve in different control variations.

FIG. 14 shows one of these variations. Here the communication to the high-pressure chamber is regulated by a control valve 47 of the described, novel kind, but of lesser output than that of the main valve 46. The communication with the low-pressure chamber is by means of a rigid conduit equipped with a throttle 54 of small cross-section (diaphragm)—FIG. 14.

When the control valve 47 is closed all the way, the same pressure is present in the enclosing space as at the outlet 56 of the main valve 46—the main valve assumes the "open all the way" position.

For a corresponding opening of the control valve, the main valve assumes a more less "partly closed" position.

This kind of control is meant for large outputs. The small control valve requires less control power (heat) than that required for the main valve.

Preferably the described control valve also may be used in refrigeration for very small outputs (refrigerators, air-conditioners, freezers) and advantageously air-conditioning, in particular in automobiles.

It is especially suited for modern ammonia plants with circuits with "dry" evaporation.

It can be manufactured from all suitable materials and also in special designs of glass and plastics, especially for highly corrosive media.

The new control valve is especially well suited in integrated system controls.

FIG. 16 shows an embodiment mode of this control for a single refrigeration plant with three cold rooms.

Regulation is implemented by a digital system control. The sixteen inputs and sixteen outputs are denoted resp. by E1 through E16 and A1 through A16. All designations relate to the control (input of control, output of control).

The evaporator feeding of the cold room 1 is by means of the new, described control valve (EEV=Electronic Expansion Valve). The stroke is measured at E1 and the temperature-measurement sites at the evaporator are at E2 and E4. These inputs E1, E2 and E4 provide the required information to the evaporator-feed control. The control value at the output A1 of this control is fed to the valve EEV to control the heating.

The temperature of the cold room 1 is regulated by the fan control and by the suction control implemented by the new control valve (ESR = Electronic Suction Control). The room temperature (E3) and the stroke measurement (E5) are the inputs to the control; the fan hook-up (A2) and the valve heating (A3) are connected to the control output. The combined fan and valve control assures optimal cold-room temperature control relative to energy.

The cold room 2 is controlled identically to cold room 1, however the cold-room 2 temperature is lower than for the cold room 1. The corresponding inputs are E6 through E10 and the outputs are A4 through A6.

The control of the evaporator-feed in cold room 3 is identical with that of cold rooms 1 and 2. The corresponding inputs are E11, E12, E14 and the output is A7.

The ambient temperature in the cold room 3 is lower than in cold rooms 1 and 2. This temperature is assured by regulating the fan and the suction. Suction regulation is assured by controlling the angular speed of the evaporator. The corresponding input is E13 and the outputs are A8 and A9.

Control of the final compressor temperature is associated with the temperature input E15.

The system control described in relation to FIG. 16 using the control valve of the invention allows optimal exploitation of the heat-exchanger power present in the refrigeration plant in combination with the suitable regulators of an integrated, digital system control. It is possible thereby to reduce the effective operating costs of a refrigeration plant.

Practically the desribed control valve is free of dead spaces. Accordingly it shall be used preferentially for arbitrary liquids and gases, illustratively in process technology and the beverage industry.

When the described control valve of the invention is used as an expansion (throttle) valve for refrigeration plants, the exiting liquid coolant (valve input) shall not be heated ahead of the throttle site. Heating the slightly super-cooled liquid coolant may lead to bubbles whereby the flow through the valve may be interfered with and which would be a reduction in volumetric output.

Accordingly steps are taken to reduce the heat transfer from the warm parts of the valve in the zone of the heater element to the intake zone of the valve, in the manner elucidated below in relation to FIGS. 17 through 29.

In particular the steps to reduce the mentioned heat transfer consist in using an adsorption filling 100 installed in the encasing space 16 of the valve. This adsorption filling 100 consists of an adsorbent (for instance activated carbon, zeolite) filled in part or in whole with a gas, for instance carbon dioxide. The encasing space is filled in such a way with the adsorbent that first it is evacuated to remove all gases and then it is filled with a gas matching the adsorbent at a particular pressure. Such adsorbent-packing (adsorbent/gas-filling) will behave in corresponding pressure-temperature zones in a manner similar to the liquid/vapor-filling in the saturated state of FIGS. 3 and 4. A particular temperature of the adsorption filling is related to a particular gas pressure. Contrary to the case of the previous embodiment modes, this pressure is exerted on the elastic center piece 8 of the valve not by the vapor of the filling liquid but instead by the warmed or possibly superheated gas. The advantage is moreover achieved thereby that on account of the significantly poorer heat transfer, the elastic center piece 8 receives less heat. The proposed adsorption filling is universally applicable.

Figure 17:
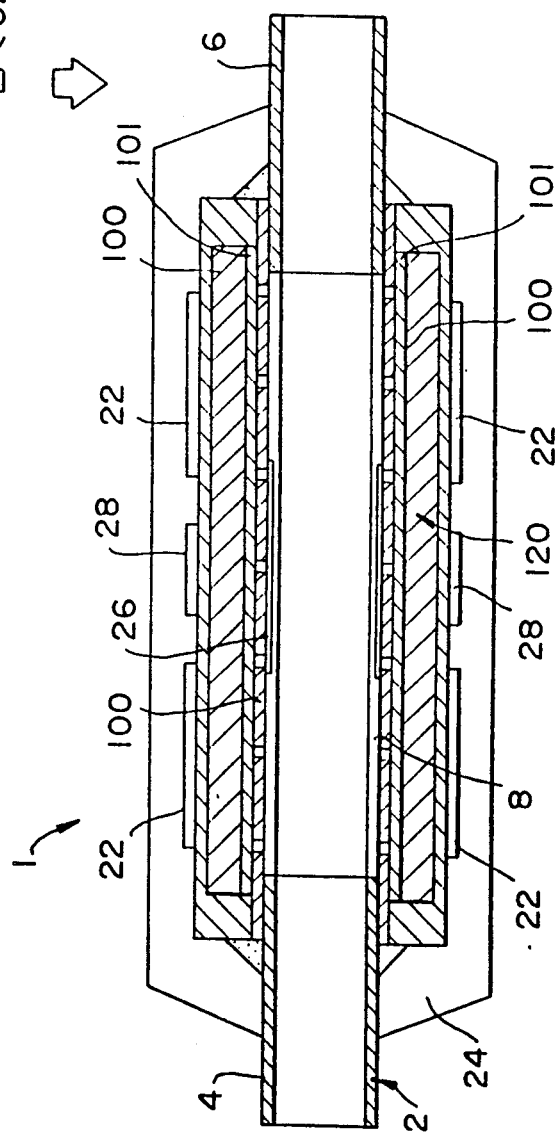

FIG. 17 shows the principle of the adsorption filling. The adsorption filling 100 is separate from the perforated support tube 10 by an additional sintered layer 101 which, jointly with passageways in the support tube, constitutes a gas chamber 93.

This layer 101 is impermeable to the adsorbent but permeable to the gas and prevents the adsorbent from migrating to undesired locations in the valve. The heater elements 22 are mounted outside the encasing tube and together with the adsorption filling 100 form a "pressure generator" 120.

FIG. 18 shows the displacement of the "warm zone'-'—i.e. of the pressure generator 120 of the valve seen in direction of flow behind the throttle site (elastic center piece 8). The encasing tube 12 consists in the region of the elastic center piece of a material 102 of poor thermal conductivity. The function of the perforated support tube 10 may be assumed by ribs with cross-ducts in the surface or by a layer of sintered material. In addition heat feedback elements 98 may be provided for instance in the form of sheetmetal spanning the heater elements and the adsorption filling, whereby heat is shunted from the end of the throttling site to the valve output.

FIG. 19 shows an embodiment in which the pressure generator 120 (heater element 22 and adsorption filling 100) is no longer directly located at the valve but is connected by a bracket 103 to the valve outlet (cold side). The adsorption filling 100 communicates through a tube 104 to the encasing space 16. The pressure generator still is in the valve insulation 24. Air slits 99 may be present in the insulation between the pressure generator 120 and the encasing tube 12 through which the heat is easier drained into the ambient so that the heat transfer to the valve shall be reduced. The adsorption filling 100 and the sinter layer 101 are located in a receptacle 105 connected by a bracket to the outlet side of the valve. The bracket not only serves fixation but also cooling: to raise the pressure, the adsorption filling must be heated by the heater elements 22 and to lower the pressure it must be cooled by shunting the heat to the cold parts. The desired cooling function is obtained by a suitable shape of the bracket 103 and selection of its material.

Figure 20:
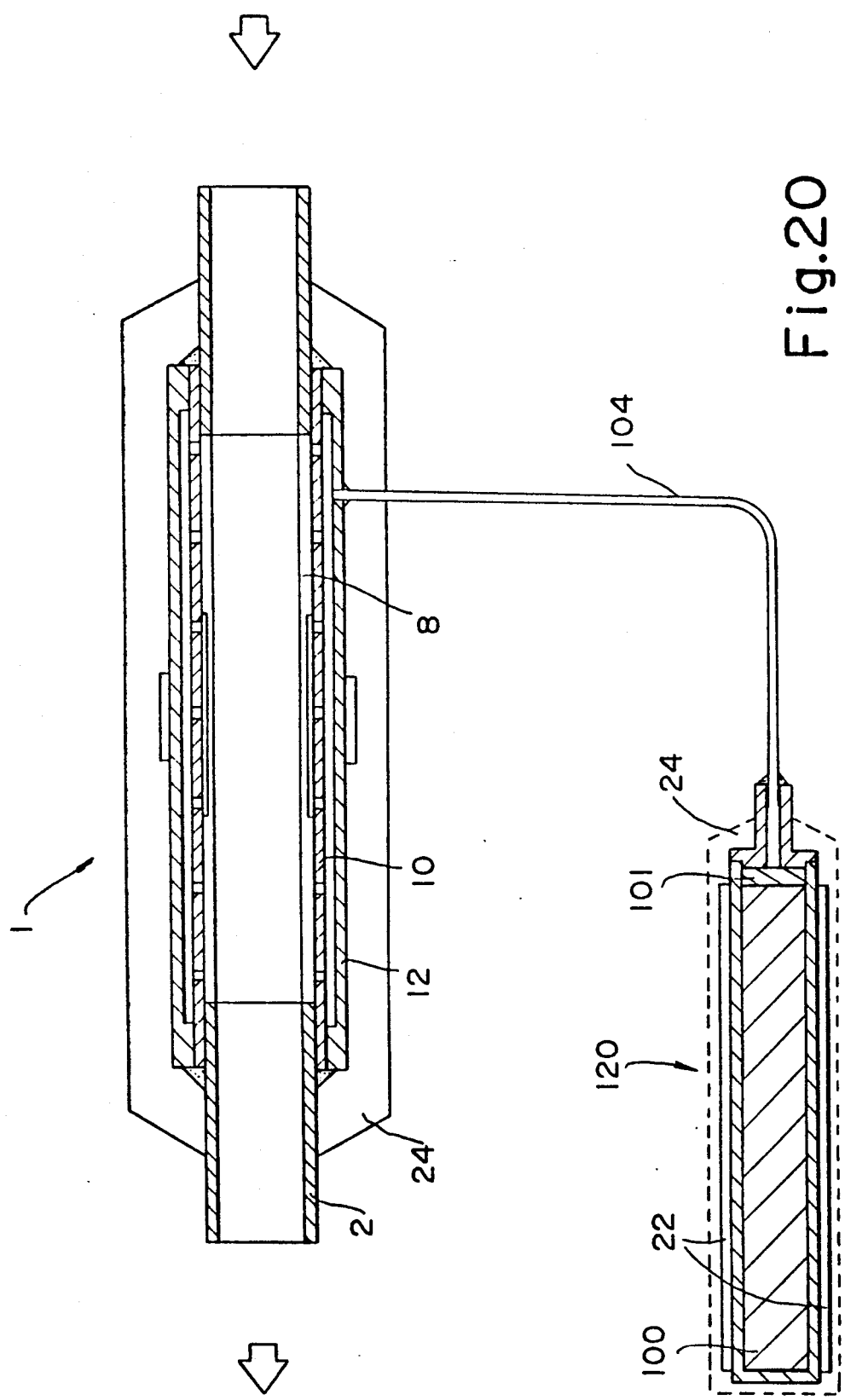

FIG. 20 shows a modification of the valve embodiment of FIG. 19. In this case the pressure generator 120 is far away from the valve. Pressure communication is implemented by a tubular conduit 104 (capillary).

Figure 21:
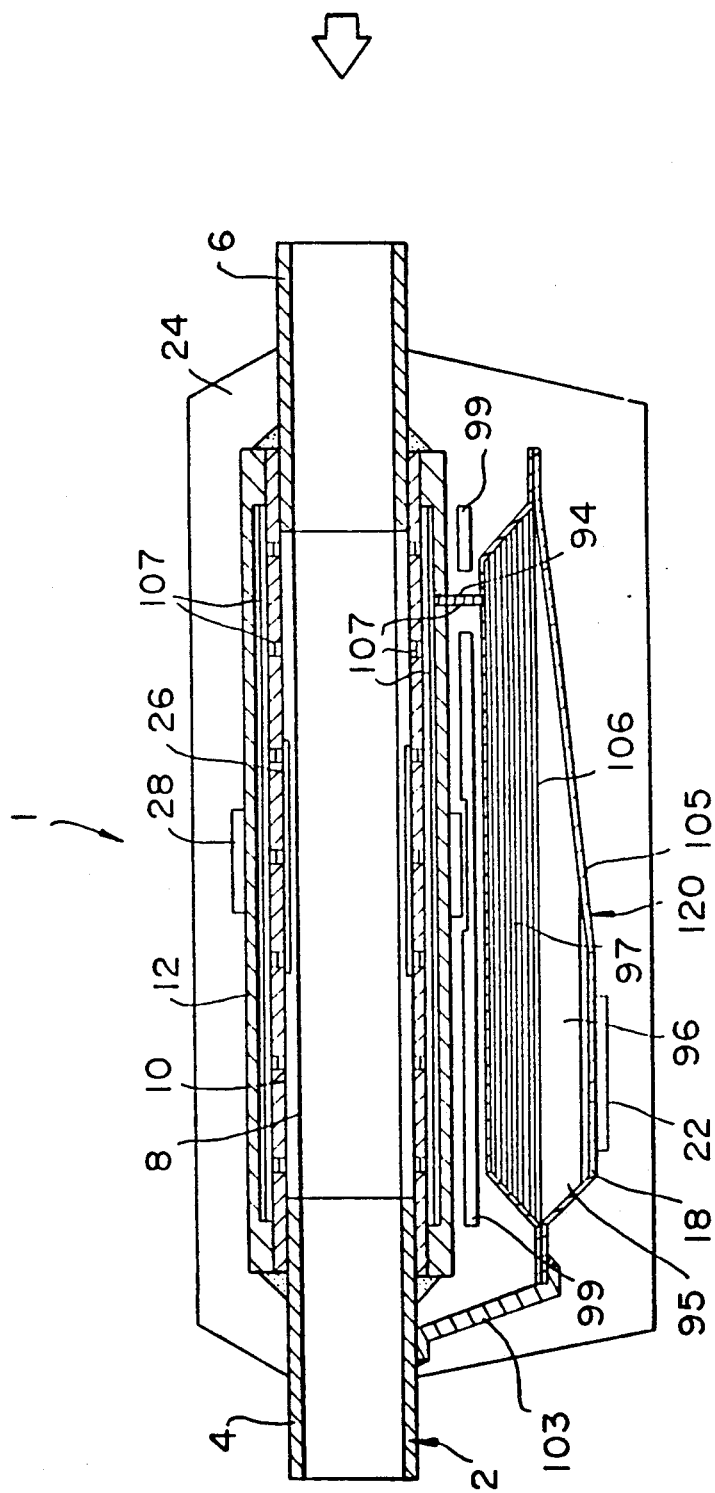

FIG. 21 shows another embodiment mode of the valve in which the pressure communication to the elastic center piece 8 is implemented by using a special hydraulic liquid 107 in a tubular duct 94. The hydraulic liquid 107 is present in an upper chamber 97 of a receptacle 105 mounted underneath the valve, this upper chamber 97 being partitioned by an elastic membrane 106 from a lower chamber 96 of the receptacle 105 containing the liquid 18 and the vapor chamber 95 and being heated as called for by the heater element 22. The hydraulic liquid, for instance a special oil, poorly conducts heat. The volume of the liquid above the membrane 106 is such that its displacement suffices for the compression of the elastic center piece and hence to close the valve. The pressure generator 120 (receptacle with hydraulic liquid, filling liquid, vapor space and heater element) in this design is mounted in a manner similar to that of FIG. 19 parallel to the actual valve unit. The receptacle 105 again is connected by a bracket 103 to the valve outlet. This bracket 103 serves the same purpose as in the embodiment of FIG. 19. In the embodiment of FIG. 21, again air slits 99 may be provided as in the design of FIG. 19.

Figure 22:
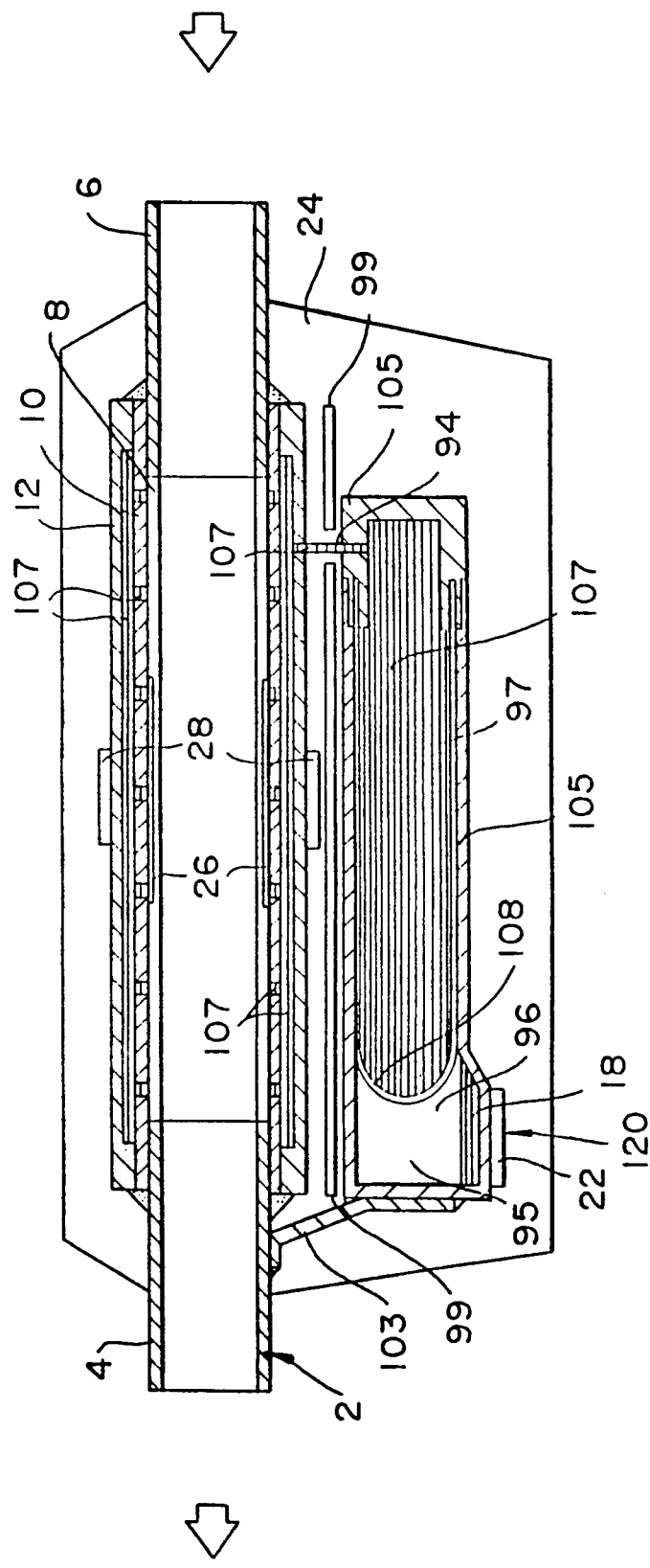

FIG. 22 shows another form of the hydraulic pressure transmission. The separation of the hydraulic liquid from the liquid/vapor-zone in this case takes place by means of an elastic hose 108 sealed at one end instead of the membrane of the embodiment of FIG. 21. Otherwise this embodiment mode corresponds essentially to that of FIG. 21, the receptacle 105 preferably being cylindrical.

Figure 23:
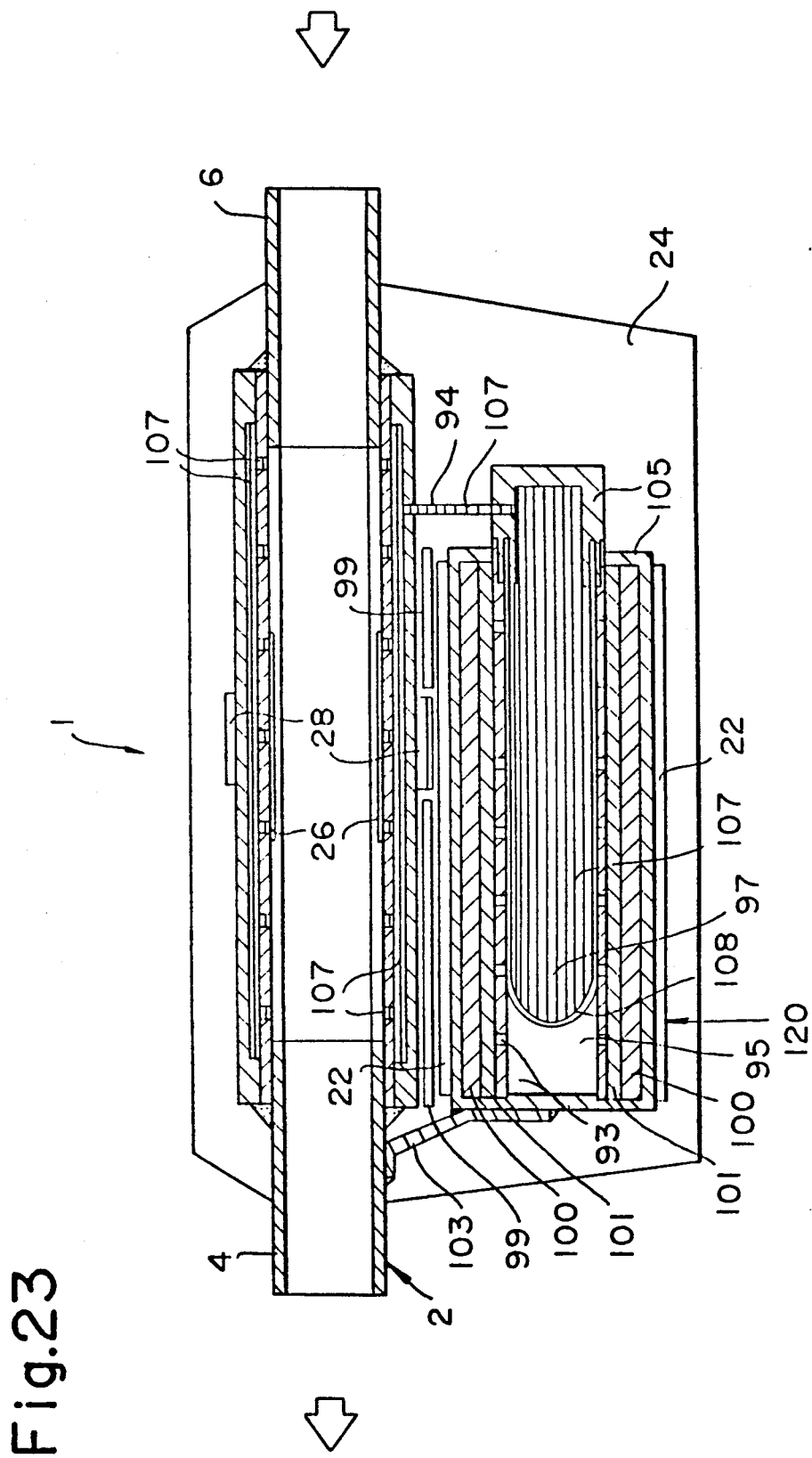

FIG. 23 shows the same hydraulic pressure transmission as FIG. 22 however an adsorption filling with gas space 93 in the manner of FIG. 17 is used in lieu of the liquid packing and the vapor space.

FIG. 24 shows apparatus for reducing the heat transfer in the longitudinal direction. The thermally poorly conducting, elastic enter piece 8 in this instance comprises an extension 110 projecting beyond the annular flange 9 and rests outside the encasing tube 12 in a specially shaped stub 109. The encasing tube 12 evinces the rib form described earlier.

FIG. 25 shows a similar embodiment as FIG. 24. Herein part of the stub 109 is made of a thermally poorly conducting material. The encasing space is filled with a sintered material 41 similarly to the embodiment of FIG. 12.

Figure 26:
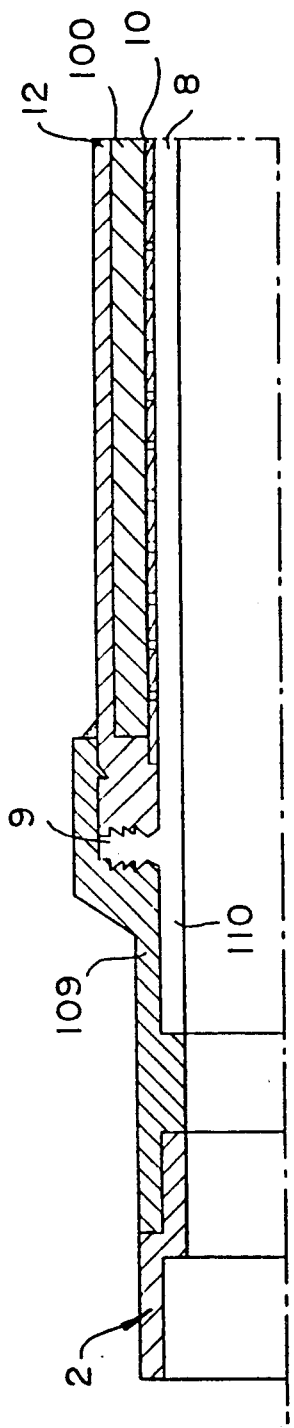

FIG. 26 shows an embodiment similar to those of FIGS. 24 and 25, however with an adsorption filling 100 similar to the embodiments of FIGS. 17 through 20 and 23.

Figure 27:
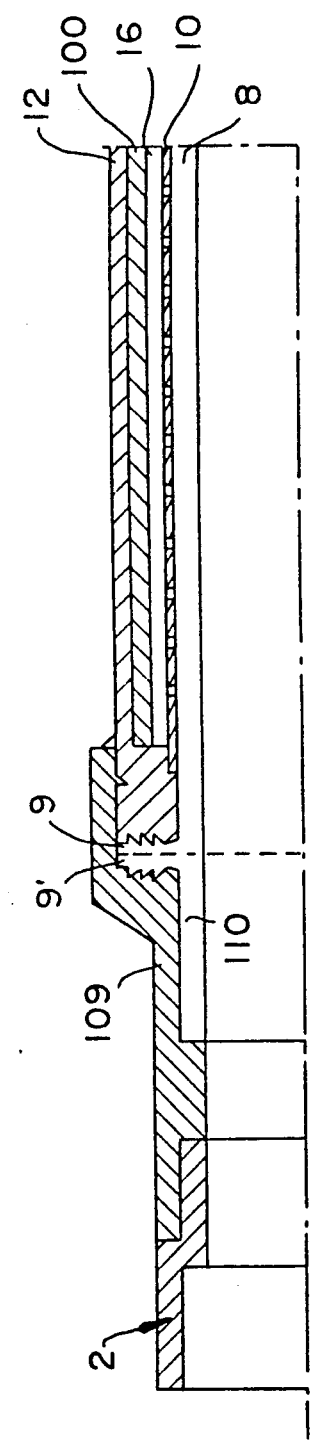

FIG. 27 shows an embodiment similar to that of FIG. 26. The adsorption filling 100 in this case only takes up part of the encasing space 16. The extension now is a separate part and comprises an annular flange 9' which by means of the stub 109 is forced tightly against the annular flange 9.

Figure 28:
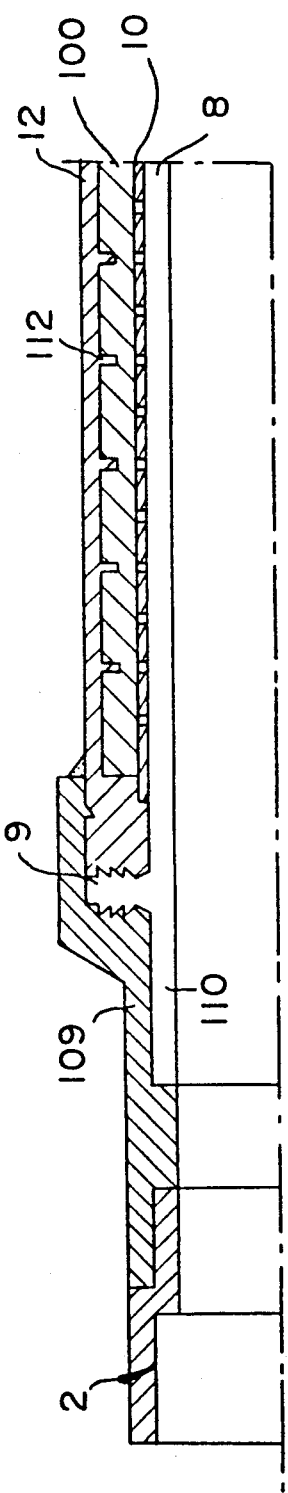

FIG. 28 shows a design similar to that of FIG. 26. In this case the encasing tube 12 is provided with ribs 112 for better heat transfer from the heater element to the adsorption filling 100.

Figure 29:
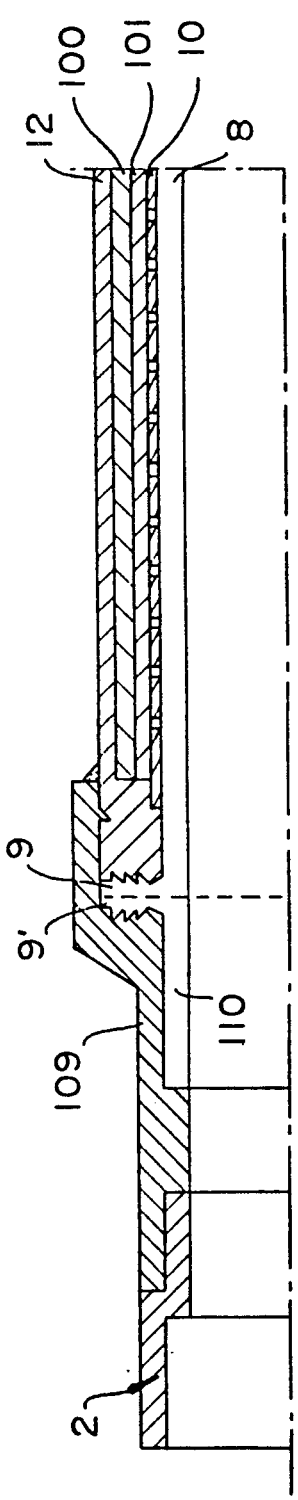

FIG. 29 shows a design similar to that of FIG. 27. Herein the sintered separation layer 101 is provided between the adsorption filling 100 and the perforated support tube 10 in the manner of FIG. 17. The separation layer 101 is permeable to the gas of the adsorption filling but impermeable to the particles of the adsorption material.

I claim:

1. A fluid control valve for controlling the flow of fluid in a piping system by changing the flow cross-section, said fluid control valve comprising:
   a) a valve body having a pair of end pieces;
   b) said valve body including casing means for forming a substantially impermeable exterior housing connected to said pair of end pieces;
   c) a substantially impermeable elastic means for reducing the flow of fluid through the valve body and forming a flexible conduit extending between and connected to said pair of end pieces located interiorly of said casing means;
   d) filling means operatively connected to said casing including a filling material for producing a change in fluid pressure about said elastic means in response to a change in temperature, so that the change in fluid pressure causes said elastic means to change shape and affect the flow of fluid through said valve body by changing the flow cross-section;
   e) electrically operated distance measuring means including a first element connected to said elastic means and a second element connected at a fixed position on said valve body for electrically determining the change in shape of said elastic means by electrically measuring the distance between first element and said second element during changes in shape of said elastic means; and,
   f) whereby, said elastic means can assume an open all the way position, a closed all the way position, or any position in between and said positions can be determined by said measuring means.

2. The control valve as defined in claim 1, wherein:
   a) said filling means includes a filling medium source; and,
   b) said filling medium source is a liquid.

3. The control valve as defined in claim 2, wherein:
   a) said filling medium source is isobutene.

4. The control valve as defined in claim 1, wherein:
   a) said filling means includes a filling medium source; and,
   b) said filling medium source comprises at least one sorbent.

5. The control valve as defined in claim 4, wherein:
   a) the filling medium source is selected from the group comprising carbon and zeolite.

6. The control valve as defined in claim 1, wherein:
   a) said elastic means includes a pair of ends for connection to said pair of end pieces;
   b) each end of said elastic means is impermeably embedded in a metal ring; and,
   c) said metal ring is connected to one of said end pieces.

7. The control valve as defined in claim 1, wherein:
   a) said elastic means includes a pair of ends for connection to said pair of end pieces;
   b) said elastic means includes an annular flange at each of said ends;
   c) each said flange being impermeably force-fitted between said casing means and said end pieces.

8. The control valve as defined in claim 7, wherein:
   a) an annular ring is located between said elastic means and said casing means.

9. The control valve as defined in claim 1, wherein:
   a) an air-permeable wall forms a perforated support tube between said casing means and said elastic means.

10. The control valve as defined in claim 9, wherein:
    a) a porous pipe formed of sintered material extends along a portion of said perforated support tube between said perforated support tube and said casing means.

11. The control valve as defined in claim 10, wherein:
    a) said sintered material is gas-permeable and adsorbent-impermeable.

12. The control valve as defined in claim 1, wherein:
    a) a fluid-permeable wall formed of sintered material is located between said casing means and said elastic means.

13. The control valve as defined in claim 1, wherein:
    a) a heater element is mounted exteriorly of said casing means.

14. The control valve as defined in claim 13, wherein:
    a) said heater element is mounted annularly on said casing means substantially adjacent one of said end pieces.

15. The control valve as defined in claim 1, wherein:

a) a heater element is mounted between said casing means and said elastic means.

16. The control valve as defined in claim 1, wherein:
a) a heater element is integrated into said casing means.

17. A control valve as defined in claim 1, wherein:
a) said casing means if formed eccentrically around said elastic means and forms a pouch for holding the filling medium source; and
b) a heater element is mounted to said pouch.

18. The control valve as defined in claim 1, wherein:
a) said elastic means forms a tube having variable wall thicknesses.

19. The control valve as defined in claim 1, wherein:
a) said valve body includes an intake opening and an outlet opening;
b) said intake opening is of smaller cross-section than said outlet opening.

20. The control valve as defined in claim 19, wherein:
a) said outlet opening includes an insert having a conical support ring forming a bracing element.

21. The control valve as defined in claim 1, wherein:
a) said measuring means is an inductive pickup.

22. The control valve as defined in claim 21, wherein:
a) said inductive pickup is a cylindrical, elastic, magnetic layer connected to said elastic means; and
b) a measurement winding is mounted on the outside of said casing means.

23. The control valve as defined in claim 22, wherein:
a) said measurement winding is a coil surrounding said casing means.

24. A control valve as defined in claim 22, wherein:
a) said measurement winding is a coil mounted laterally of said casing means.

25. The control valve as defined in claim 1, wherein:
a) said measuring means is a capacitive pickup.

26. The control valve as defined in claim 25, wherein:
a) said capacitive pickup includes an elastic electrode connected to said elastic means; and
b) electrodes are mounted on said exterior of said casing means.

27. The control valve as defined in claim 1, wherein:
a) said filling medium source is spaces from said elastic means; and
b) a passage is located between said filling medium source and said elastic means forming a conduit for the flow of fluid.

28. The control valve as defined in claim 27, further comprising:
a) a heat feed back element providing a conduit for heat flow from said elastic means to a valve outlet.

29. A fluid control valve for changing the flow of fluid through a piping system by reducing the flow cross-section, said control valve comprising:
a) a valve body having a pair of end pieces;
b) said valve body including casing means for forming a substantially impermeable exterior housing connected to said pair of end pieces;
c) a substantially impermeable elastic means forming a flexible conduit extending between and connected to said pair of end pieces;
d) filling means for producing a change in fluid pressure about said elastic means in response to a change in temperature, so that the change in fluid pressure causes said elastic means to change shape and effect the flow of fluid through said valve body;
e) a perforated support tube extending between said impermeable elastic means and said casing means; and
f) a layer of sintered material located between said perforated support tube and said casing means, said layer of sintered material being fluid permeable.

* * * * *